US009738301B2

United States Patent
Vezina et al.

(10) Patent No.: US 9,738,301 B2
(45) Date of Patent: Aug. 22, 2017

(54) SNOWMOBILE FOOTRESTS

(71) Applicant: BOMBARDIER RECREATIONAL PRODUCTS INC., Valcourt (CA)

(72) Inventors: Sebastien Vezina, Sherbrooke (CA); Yvon Bedard, Orford (CA); Martin Gagnon, Valcourt (CA); Jonathan Fortier, Lawrenceville (CA)

(73) Assignee: BOMBARDIER RECREATIONAL PRODUCTS INC., Valcourt (CA)

(*) Notice: Subject to any disclaimer, the term of this patent is extended or adjusted under 35 U.S.C. 154(b) by 0 days.

(21) Appl. No.: 14/788,624

(22) Filed: Jun. 30, 2015

(65) Prior Publication Data
US 2016/0194021 A1 Jul. 7, 2016

Related U.S. Application Data

(60) Provisional application No. 62/019,262, filed on Jun. 30, 2014.

(51) Int. Cl.
*B62B 17/06* (2006.01)
*B62M 27/02* (2006.01)

(52) U.S. Cl.
CPC .......... *B62B 17/063* (2013.01); *B62M 27/02* (2013.01); *B62M 2027/023* (2013.01); *B62M 2027/025* (2013.01); *B62M 2027/028* (2013.01)

(58) Field of Classification Search
CPC .... B62B 17/063; B62B 17/065; B62M 27/02; B62M 2027/023; B62M 2027/028
USPC ...................................................... 180/190
See application file for complete search history.

(56) References Cited

U.S. PATENT DOCUMENTS

| 6,270,106 | B1* | 8/2001 | Maki ................ B62K 5/01 180/21 |
| 7,543,669 | B2 | 6/2009 | Kelahaara |
| 2005/0205320 | A1* | 9/2005 | Girouard ............ B62J 35/00 180/190 |
| 2006/0162976 | A1* | 7/2006 | Desmarais ........ B62M 27/02 180/190 |
| 2008/0185203 | A1* | 8/2008 | Matsudo ............ B62M 27/02 180/190 |
| 2008/0196958 | A1* | 8/2008 | Vezina .............. B62J 25/00 180/190 |
| 2010/0108423 | A1* | 5/2010 | Keel ................ B62K 11/04 180/227 |
| 2011/0290574 | A1* | 12/2011 | Maltais ............ B62M 27/02 180/190 |

* cited by examiner

*Primary Examiner* — Tony Winner
(74) *Attorney, Agent, or Firm* — BCF LLP

(57) ABSTRACT

A snowmobile footrest adapted to be disposed on a side of a snowmobile tunnel includes a plurality of interconnected ribs. At least one first rib extending in a first direction includes an upper first rib surface and a lower first rib surface defining a first rib height therebetween. A pair of vertical first rib surfaces, extending generally in a vertical direction between the upper and lower first rib surfaces, define a first rib thickness therebetween. The first rib height is greater than the first rib thickness. At least one second rib is connected to the at least one first rib. Each second rib extends in a second direction, the second direction being at an angle with respect to the first direction. The at least one first rib and the at least one second rib define at least one space therebetween. Snowmobiles having the footrests are also disclosed.

26 Claims, 30 Drawing Sheets

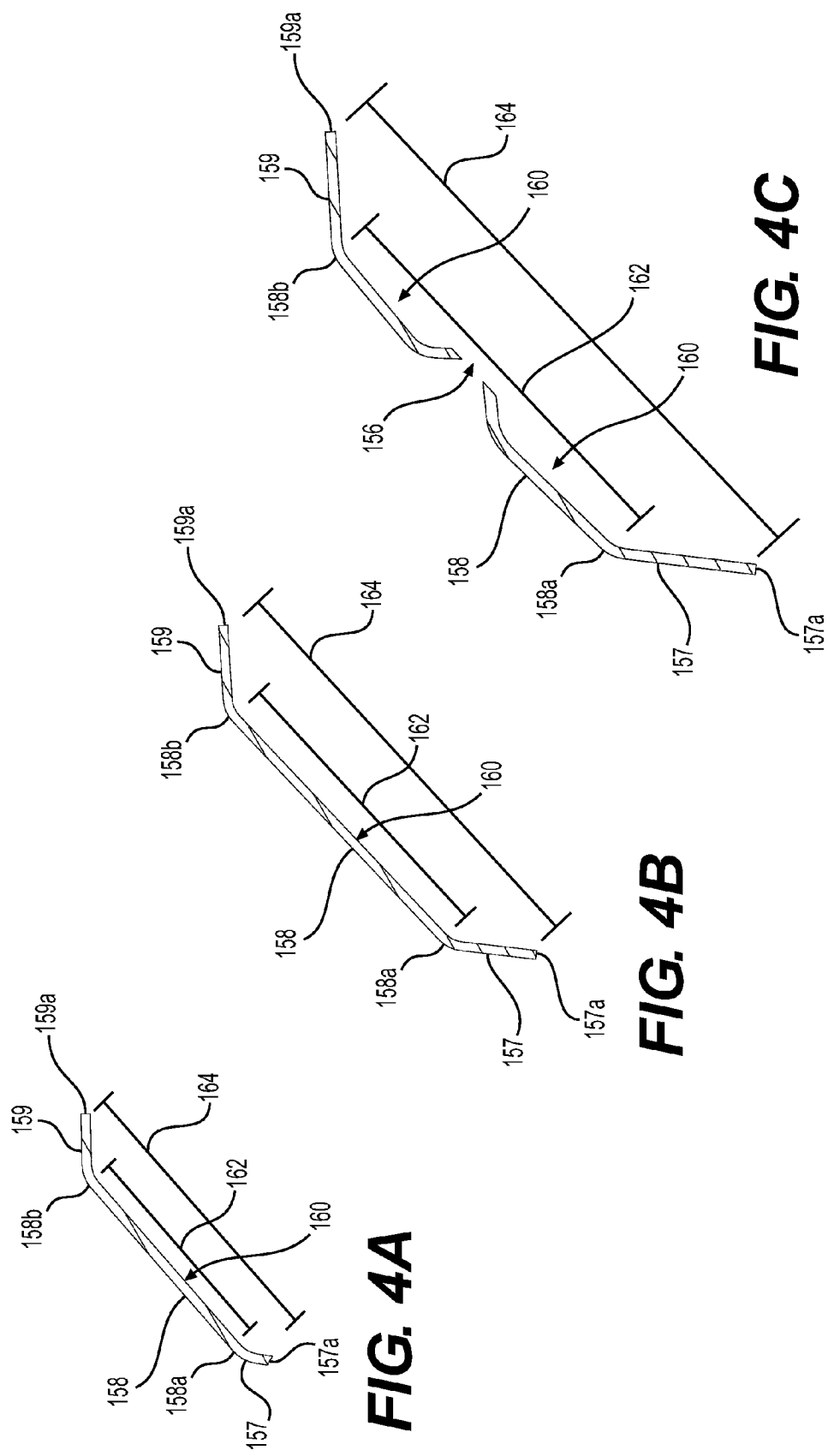

SNOWMOBILE FOOTRESTS

CROSS-REFERENCE

The present application claims priority to U.S. Provisional Patent Application No. 62/019,262, filed on Jun. 30, 2014, the entirety of which is incorporated herein by reference.

TECHNICAL FIELD

The present technology relates to footrests for snowmobiles.

BACKGROUND

Snowmobiles are designed to operate on different kinds of snow-covered surfaces. A snowmobile traveling on soft snow often begins to sink in the snow until the footrests begin to contact the snow. Once the footrests begin to contact the snow, increasingly more of the weight of the snowmobile is transferred from the tracks to the footrests, as a result of which, the tracks begin to lose traction with the snow. It is therefore desirable to design the footrests to prevent or reduce this loss of traction between the tracks and the snow when travelling on soft snow-covered surfaces. It is also desirable to have the footrests be strong and easily assembled and disassembled for maintenance, repairs and replacement.

SUMMARY

One object of the present is to ameliorate at least some of the inconveniences of the prior art.

In accordance with one aspect of the present technology, there is provided a snowmobile including a frame having a longitudinally extending tunnel, at least one ski operatively connected to the frame, an endless drive track operatively connected to the frame, and a motor supported by the frame and operatively connected to the drive track for propelling the snowmobile. A straddle-type seat is disposed above the tunnel and adapted to accommodate a rider. A left footrest is connected to the tunnel and disposed on a left side thereof. A right footrest is connected to the tunnel and disposed on a right side thereof. Each of the left and right footrests includes a plurality of interconnected ribs extending generally horizontally. The plurality of ribs includes at least one first rib extending in a first direction. Each first rib includes an upper first rib surface and a lower first rib surface defining a first rib height therebetween. Each first rib includes a pair of vertical first rib surfaces extending generally in a vertical direction between the upper and lower first rib surfaces. The pair of vertical surfaces define a first rib thickness therebetween. The first rib height is greater than the first rib thickness. At least one second rib is connected to the at least one first rib. Each second rib extends in a second direction, the second direction being at an angle with respect to the first direction. The at least one first rib and the at least one second rib define at least one hole therebetween.

In some implementations, for each portion of any one of the first ribs having any one of the second ribs connected thereto, the lower first rib surface of that portion is disposed vertically lower than the one of the second ribs connected thereto.

In some implementations, for each portion of any one of the first ribs having any one of the second ribs connected thereto, the lower first rib surface is disposed vertically lower than the one of the second ribs connected thereto by a distance greater than the first rib thickness.

In some implementations, a ratio of the distance to the first rib thickness is greater than 1.5 and less than 5.5.

In some implementations, the ratio is a first ratio. Each of the at least one hole has a hole width in a direction perpendicular to the first direction. A second ratio of the hole width measured in millimeters to the first ratio is greater than 5.0 and less than 15.0.

In some implementations, each of the at least one hole has a hole width measured in a direction perpendicular to the first direction, and a ratio of the hole width to the distance is greater than 1.0 and less than 6.0. In some implementations, the first direction is a longitudinal direction of the snowmobile.

In some implementations, at a connection between any one of the second ribs and any one of the first ribs, the lower first rib surface of that first rib is disposed vertically lower than that second rib.

In some implementations, the lower first rib surface of that first rib is disposed vertically lower than the second rib by a distance greater than the first rib thickness.

In some implementations, the second direction is a lateral direction of the snowmobile.

In some implementations, each second rib includes an upper second rib surface and a lower second rib surface, the upper and lower second rib surfaces being spaced from each other in the vertical direction and defining a second rib height therebetween. A front second rib surface and a rear second rib surface extend between the upper and lower second rib surfaces and defining a second rib thickness therebetween, the second rib thickness being greater than the second rib height.

In some implementations, the second rib thickness is greater than the first rib thickness.

In some implementations, a first distance between two consecutive ones of the at least one first rib is smaller than a second distance between two consecutive ones of the at least one second rib, the first distance being measured in a direction perpendicular to the first direction, the second distance being measured in a direction perpendicular to the second direction.

In some implementations, the at least one first rib is integrally formed with the at least one second rib.

In some implementations, the at least one first rib and the at least one second rib are formed at least in part by extrusion.

In some implementations, the extrusion is in the first direction.

In some implementations, each of the left and right footrests further comprises a plurality of teeth, each tooth of the plurality of teeth projecting upwardly from at least one of: at least one of the first ribs and at least one of the second ribs.

In some implementations, each of the left and right footrests is removably connected to the tunnel.

In some implementations, each of the left and right footrests further comprises a mounting flange extending along a laterally inner edge thereof, the mounting flange being removably connected to the tunnel.

In some implementations, each of the left and right footrests further includes a front tunnel extension extending generally horizontally and laterally outwardly from the tunnel and being integrally formed therewith, the plurality of interconnected ribs being disposed rearward of the front tunnel extension. A mounting bracket is connected to a laterally outer edge of the plurality of ribs and removably connected to the front tunnel extension.

In some implementations, the tunnel comprises a left side surface and a right side surface. The plurality of interconnected ribs of the left footrest is disposed leftwardly of the left side surface, and the plurality of interconnected ribs of the right footrest is disposed rightwardly of the right side surface. Each of the left and right footrests further includes an inner mounting flange formed along a laterally inner edge of the corresponding plurality of interconnected ribs and to the corresponding one of the left and right side surfaces of the tunnel. An outer mounting bracket is connected to a laterally outer edge of the corresponding plurality of interconnected ribs and to a laterally outer edge of the corresponding front tunnel extension. A rear mounting bracket is connected to the outer mounting bracket and to the corresponding one of the left and right side surfaces of the tunnel.

In some implementations, when viewed from a top of the snowmobile, each of the left and right footrests tapers in a rearward direction.

In some implementations, the first direction is a generally longitudinal direction of the snowmobile. The at least one first rib includes a laterally outer first rib and a laterally inner first rib disposed laterally inwardly of the laterally outer first rib. The laterally inner first rib extends farther rearward than the laterally outer first rib.

In accordance with another aspect of the present technology, there is provided a footrest is adapted to be disposed on a side of a longitudinally extending tunnel of a snowmobile. The footrest includes a plurality of interconnected ribs. The plurality of interconnected ribs includes at least one first rib extending in a first direction. Each first rib has an upper first rib surface and a lower first rib surface defining a first rib height therebetween. Each first rib has a pair of vertical first rib surfaces extending generally in a vertical direction between the upper and lower first rib surfaces. The pair of vertical surfaces define a first rib thickness therebetween. The first rib height is greater than the first rib thickness. At least one second rib is connected to the at least one first rib. Each second rib extends in a second direction, the second direction being at an angle with respect to the first direction. The at least one first rib and the at least one second rib define at least one hole therebetween.

For purposes of this application, terms related to spatial orientation such as forwardly, rearwardly, upwardly, downwardly, left, and right, are as they would normally be understood by a driver of the vehicle sitting thereon in a normal riding position. Terms related to spatial orientation when describing or referring to components or sub-assemblies of the vehicle, separately from the vehicle, such as the ice scratcher for example, should be understood as they would be understood when these components or sub-assemblies are mounted to the vehicle.

Implementations of the present technology each have at least one of the above-mentioned aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 4A is a line section taken along the line 4A-4A of FIG. 3;

FIG. 4B is a line section taken along the line 4B-4B of FIG. 3;

FIG. 4C is a line section taken along the line 4C-4C of FIG. 3;

DETAILED DESCRIPTION

Figure 1:
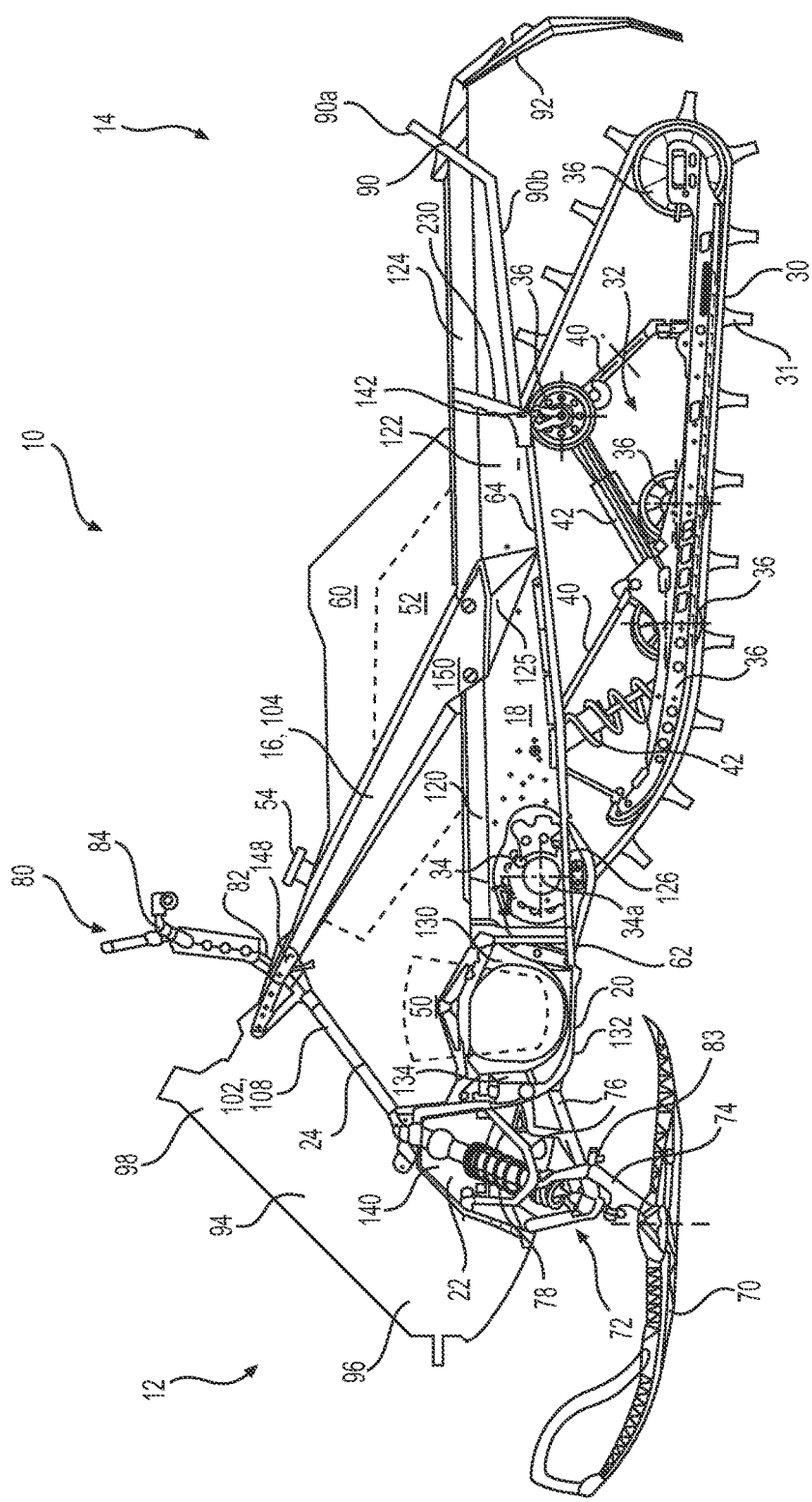
FIG. 1 is a partially cut-away left side elevation view of a portion of a snowmobile.

Referring to FIG. 1, a snowmobile 10 includes a forward end 12 and a rearward end 14 which are defined consistently with a travel direction of the vehicle 10. The snowmobile 10 includes a vehicle body in the form of a frame or chassis 16 which includes a rear tunnel 18, an engine cradle 20, a front suspension module 22 and an upper support structure 24. The tunnel 18 defines a longitudinal centerplane 13 (longitudinally disposed vertical plane, FIGS. 2C and 2D) of the snowmobile 10. The frame 16 will be described in further detail below.

A motor 50 (schematically illustrated in FIG. 1), which in the illustrated implementation is an internal combustion engine, is carried in an engine compartment defined by the engine cradle 20. A fuel tank 52, supported above the tunnel 18, supplies fuel to the engine 50 for its operation. Coolant used to cool the engine 50 is circulated through heat exchangers 25 (FIG. 2B) mounted to the tunnel 18.

An endless drive track 30 is positioned at the rear end 14 of the snowmobile 10. The drive track 30 is disposed generally under the tunnel 18, and operatively connected to the motor 50 through a belt transmission system (not shown) and a reduction drive (not shown). The endless drive track 30 is driven to run about a rear suspension assembly 32 connected to the tunnel 18 for propulsion of the snowmobile 10. The endless drive track 30 has a plurality of lugs 31 extending from an outer surface thereof to provide traction to the track 30.

The rear suspension assembly 32 includes a drive sprocket 34, one or more idler wheels 36 and a pair of slide rails 38 in sliding contact with the endless drive track 30. The drive sprocket 34 (shown schematically in FIG. 1) is mounted on a drive axle 35 and defines a sprocket axis 34a. The slide rails 38 are attached to the tunnel 18 by front and rear suspension arms 40 and one or more shock absorbers 42 which include a coil spring (not indicated) surrounding the individual shock absorbers 42. It is contemplated that the snowmobile 10 could be provided with a different implementation of a rear suspension assembly 32 than the one shown herein.

A straddle-type seat 60 is positioned atop the fuel tank 52. It s contemplated that the seat 60 could be positioned on the tunnel 18. The seat 60 and the fuel tank 58 are connected to the upper support structure 24 of the frame 16 as will be described below in further detail. A fuel tank filler opening covered by a cap 54 is disposed on the upper surface of the fuel tank 52 in front of the seat 60. It is contemplated that the fuel tank filler opening could be disposed elsewhere on the fuel tank 52. The seat 60 is adapted to accommodate a driver of the snowmobile 10. The seat 60 can also be configured to accommodate a passenger. A footrest 64, in the form of a footboard, is positioned on each side of the snowmobile 10 below the seat 60 to accommodate the driver's feet. The footrest 64 will be described below in further detail.

Two skis 70 positioned at the forward end 12 of the snowmobile 10 are attached to the front suspension module 22 of the frame 16 through a front suspension assembly 72. The front suspension module 22 is connected to the front end of the engine cradle 24. The front suspension assembly 72 includes ski legs 74, supporting arms 76, shock absorbers 78 and ball joints (not shown) for operatively connecting to the respective ski leg 74, supporting arms 76 and a steering column 82.

A steering assembly 80, including the steering column 82 and a handlebar 84, is provided generally forward of the seat 60. The steering column 82 is rotatably connected to the frame 16. The lower end of the steering column 82 is connected to the ski legs 74 via steering rods 83 (the left end of the left steering rod 83 can be seen in FIG. 1). The handlebar 84 is attached to the upper end of the steering column 82. The handlebar 84 is positioned in front of the seat 60. The handlebar 84 is used to rotate the steering column 82, and thereby the skis 70, in order to steer the vehicle 10. A throttle operator (not shown) in the form of a thumb-actuated throttle lever is mounted to the right side of the handlebar 84. Other types of throttle operators, such as a finger-actuated throttle lever and a twist grip, are also contemplated. A brake actuator (not indicated), in the form of a hand brake lever, is provided on the left side of the handlebar 84 for braking the snowmobile 10 in a known manner.

At the rear end of the snowmobile 10, a rear bumper 90 and a snow flap 92 are connected to the rear end of the tunnel 18. The rear bumper 90, in the form of an inverted U-shaped tubular structure, extends above the rear end of the tunnel 18. The snow flap 92 extends downward from the rear end of the tunnel 18. The snow flap 92 protects against snow that can be projected upward from the drive track 30 when the snowmobile 10 is being driven. The snow flap 92 extends rearwardly from its front end which is disposed between the tunnel 18 and the rear bumper 90, and then extends downwardly. The downwardly extending portion of the snow flap 92 defines a surface facing the track 30 that is arcuate. The lower end of the snow flap 92 is disposed rearward of the rearmost point of the drive track 30. As such, during operation of the snowmobile 10, some of the snow projected rearward by the drive track 30 is redirected upwardly and forwardly so as to be projected onto the heat exchanger 25 connected to the tunnel 18 to improve cooling.

Figure 13:
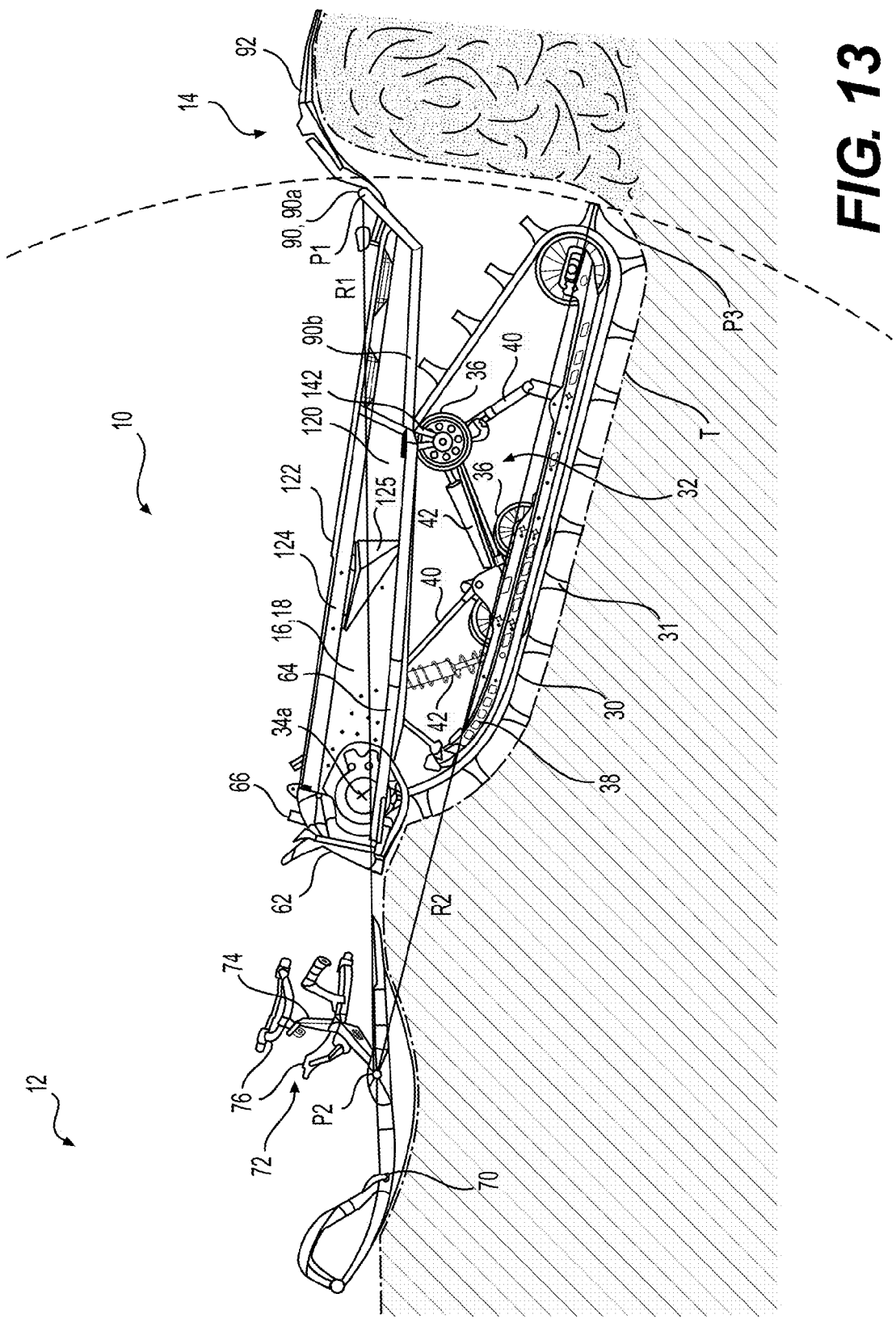
FIG. 13 is a left side elevation view of a portion of the snowmobile of FIG. 1 shown in a trenching configuration, with a snow flap of the snowmobile in a pivoted position.

As can be seen in FIG. 13, the snow flap 92 can also pivot and bend relative to the tunnel 18. Under certain conditions, it is possible for the drive track 30 to have reduced traction with the surface on which it travels. Should this surface be deep loose snow, the drive track 30 can start digging into the snow thereby forming a trench until it regains traction, which is sometimes referred to as trenching. In prior art snowmobiles, the tunnel 18 and/or the rear bumper 90 extends further rearward than in the snowmobile 10 described herein. As a result, after a certain amount of trenching, the rear portion of the tunnel 18 and/or of the rear bumper 90 can sit on the edge of the trench dug by the drive track 30. The snow flap 92 bridging between the end of the tunnel 18 and the bumper 90 increases support for the snowmobile 10 on the edge of the trench. As a result, the snowmobile 10 can no longer move down as the drive track 30 digs the trench, which eventually result in the drive track 30 no longer being capable of digging and losing all traction. This is sometimes referred to as jacking. In the snowmobile of the present implementation, the rearmost point P1 of the rear bumper 90 is disposed at a distance R1 from the point P2 about which the ski 70 pivots relative to the ski leg 74. The rearwardmost point P3 of the track 30 is disposed at a distance R2 from point P2. By having R1 less than R2, the rearmost point of the bumper 90, which in the present implementation is further back than the tunnel 18, remains inside the trench T dug by the track 30 and will not sit on the edge of the trench T, thus preventing jacking. Although a portion of the snow flap 92 extending rearward of the bumper 90 may contact the edge to the trench T as shown, since the snow flap 92 is made of flexible material, it bends when the weight of the snowmobile 10 is applied to it, and therefore does not cause jacking.

At the front end 12 of the snowmobile 10, fairings 94 enclose the motor 50 and the belt transmission system, thereby providing an external shell that not only protects the motor 50 and the transmission system, but can also be decorated to make the snowmobile 10 more aesthetically pleasing. Typically, the fairings 94 include a hood 96 and one or more side panels which can be opened to allow access to the motor 50 and the belt transmission system when this is required, for example, for inspection or maintenance of the motor 50 and/or the transmission system. A windshield 98 connected to the fairings 94 acts as a wind screen to lessen the force of the air on the rider while the snowmobile 10 is moving. The windshield 98 may be connected directly to the handlebar 84.

The snowmobile 10 includes other components such as a display cluster, an exhaust system, an air intake system, and the like. As it is believed that these components would be readily recognized by one of ordinary skill in the art, further explanation and description of these components will not be provided herein.

Figure 14:
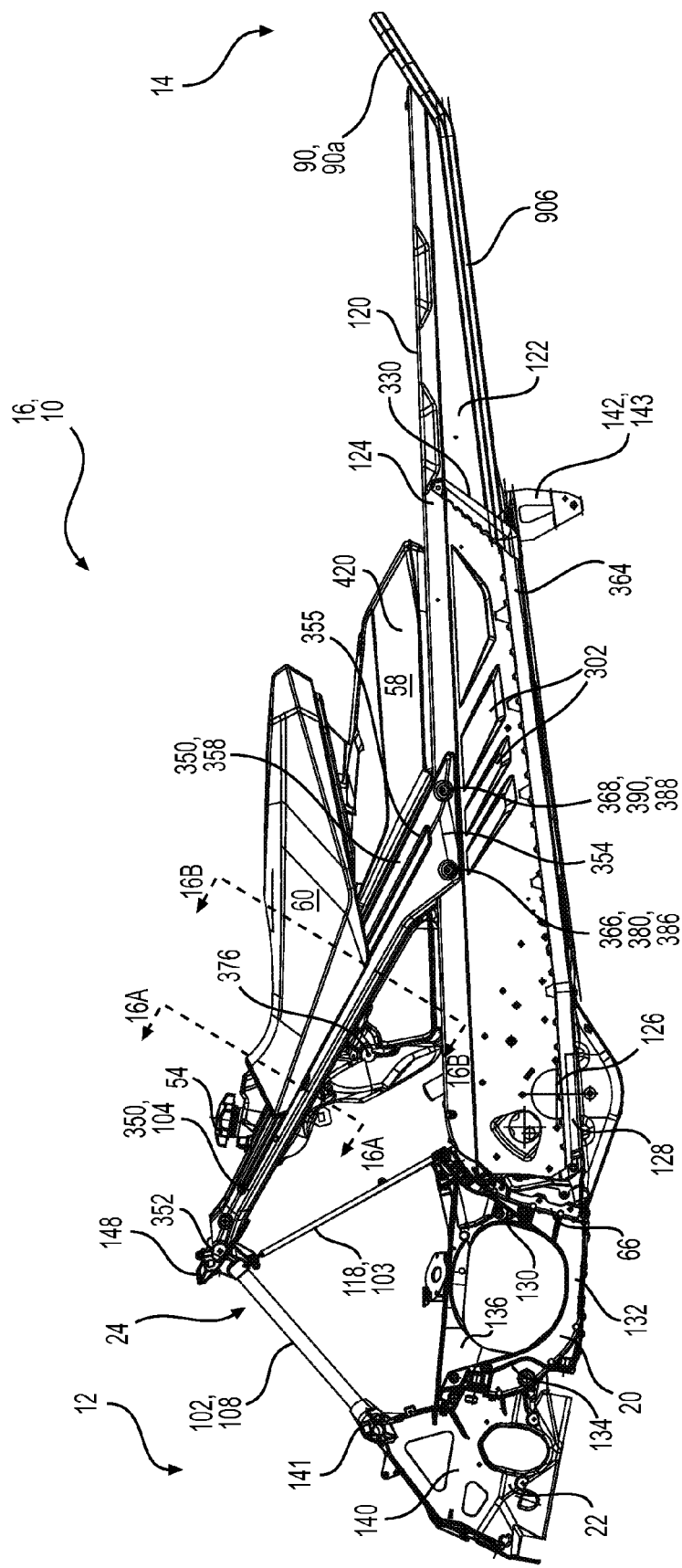
FIG. 14 is a left side elevation view of a snowmobile frame, fuel tank and seat in accordance with another implementation.
Figure 15:
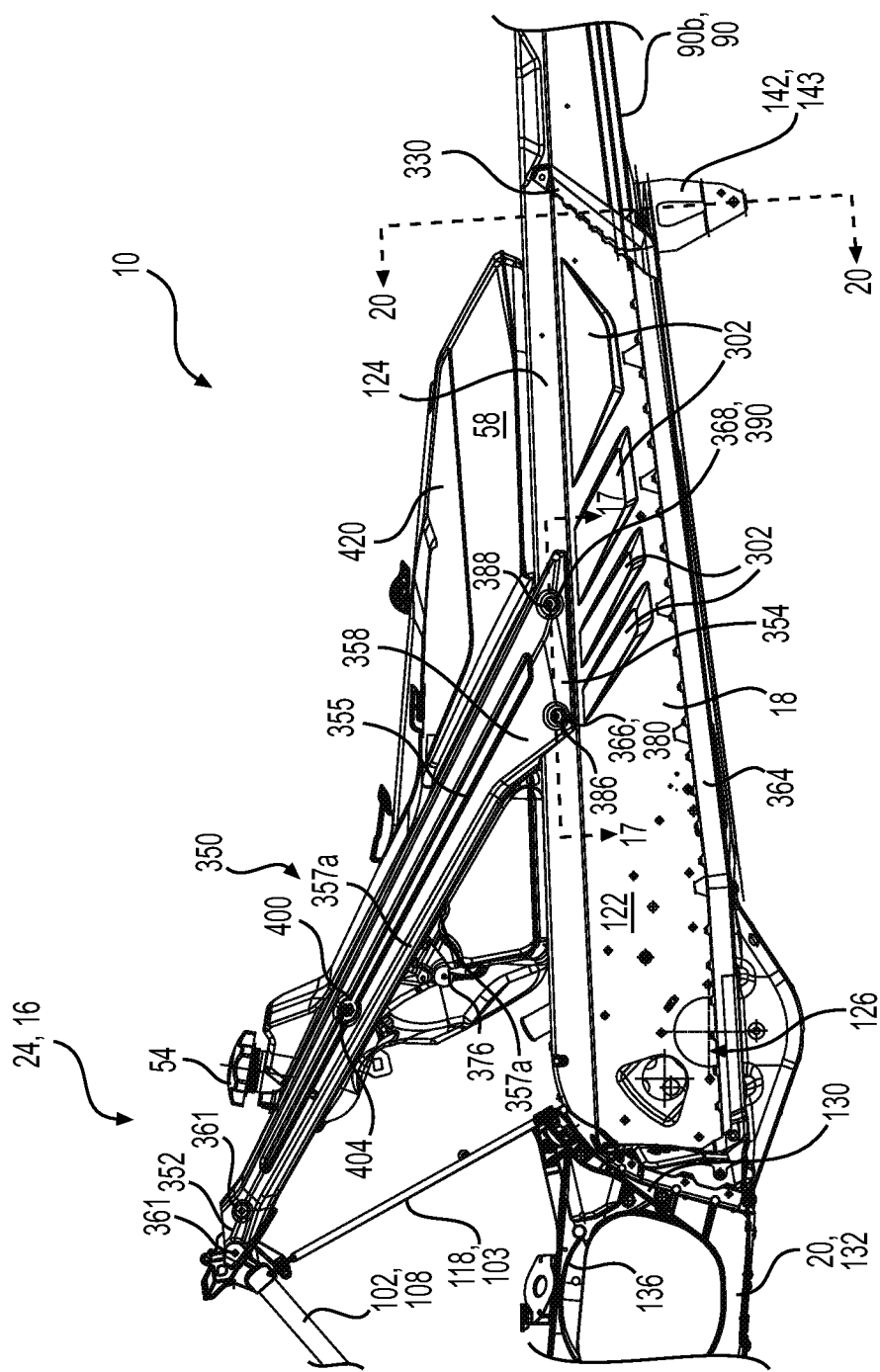
FIG. 15 is a left side elevation view of the snowmobile frame and fuel tank of FIG. 14 with the seat being removed for clarity.

The frame 16 will now be described in more detail with reference to FIGS. 2A to 2D, 14, 15, 20 and 21. As previously mentioned, the frame 16 of the snowmobile 10 includes the tunnel 18, the engine cradle 20, the front suspension module 22, and the upper structure 24. The implementation of the frame 16 shown in FIGS. 14, 15 and 20 is generally similar to the implementation of the frame 16 shown in FIGS. 2A to 2D. The differences between the rear legs 350 of FIGS. 14 to 21 and the rear legs 150 of FIGS. 2A to 2D will be discussed in detail below. As such all other features of the implementation of the frame 16 in FIGS. 14, 15 and 20 have been labeled with the same reference numbers as in FIGS. 2A to 2D. Some of the differences between corresponding features of the frame 16 of FIGS. 14, 15 and 20 and the frame 16 of FIGS. 2A to 2D will be pointed out throughout the description where relevant.

Figure 2A:
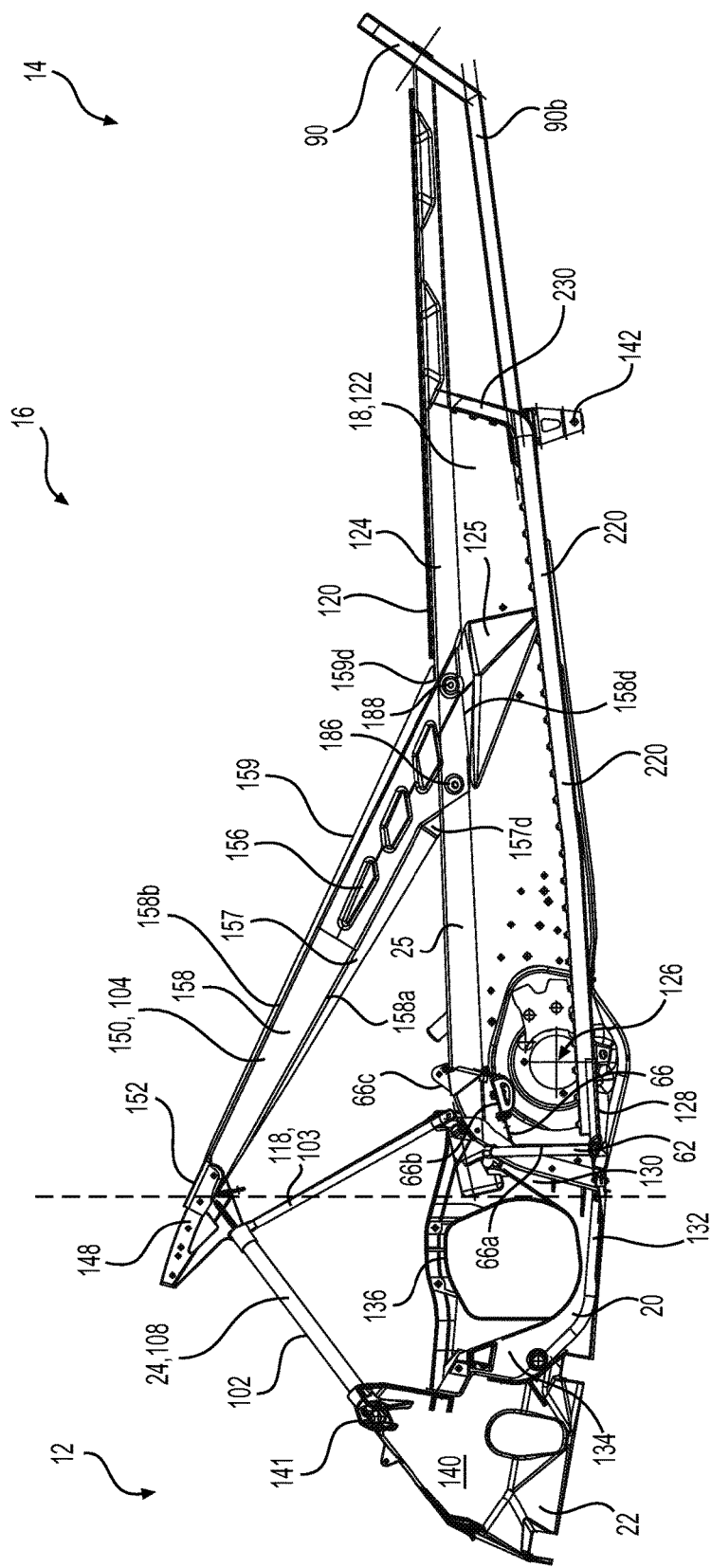
FIG. 2A is a left side elevation view of a portion of the snowmobile of FIG. 1.
Figure 2B:
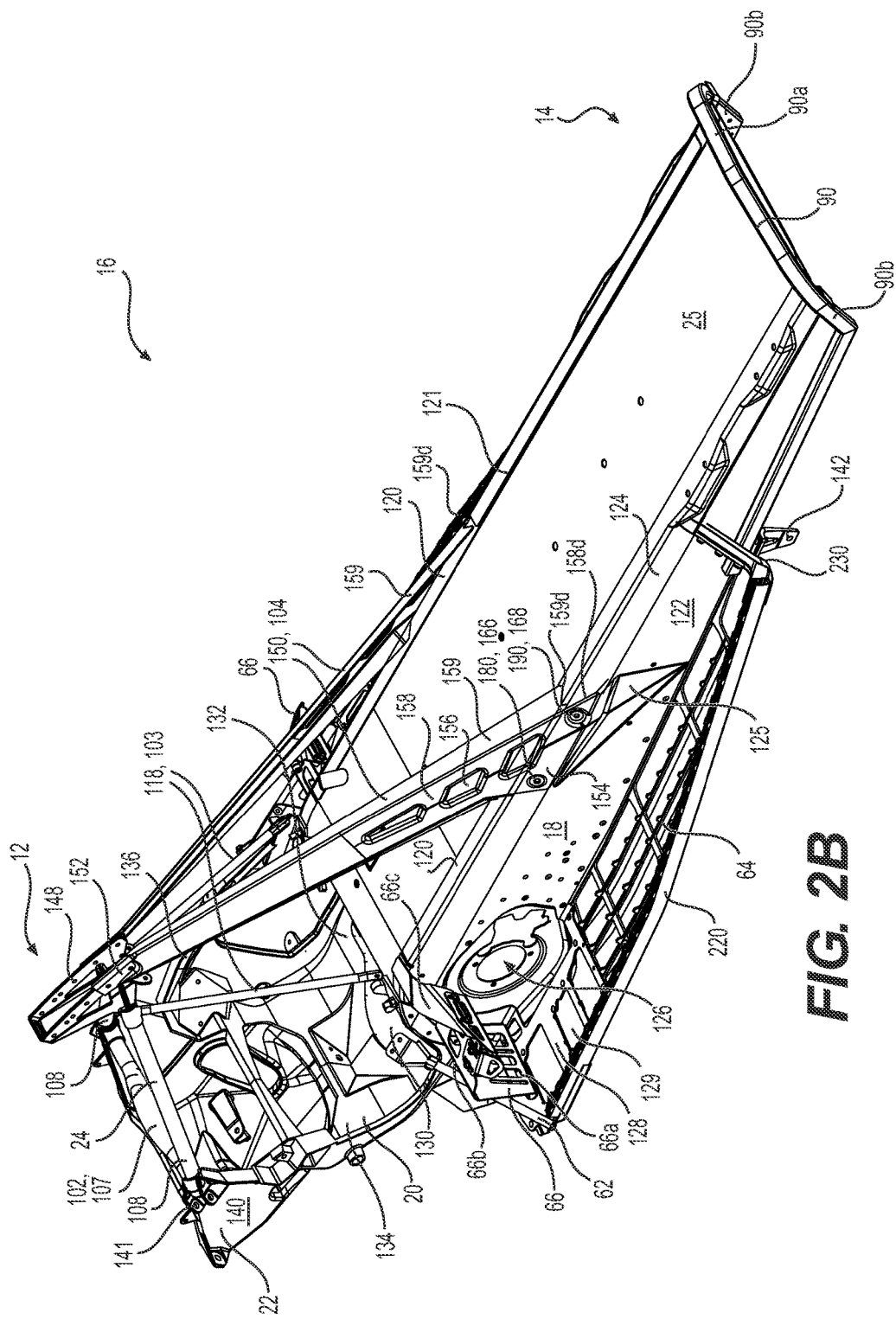
FIG. 2B is a perspective view, taken from a rear, left side, of the snowmobile portion of FIG. 2A.
Figure 2C:
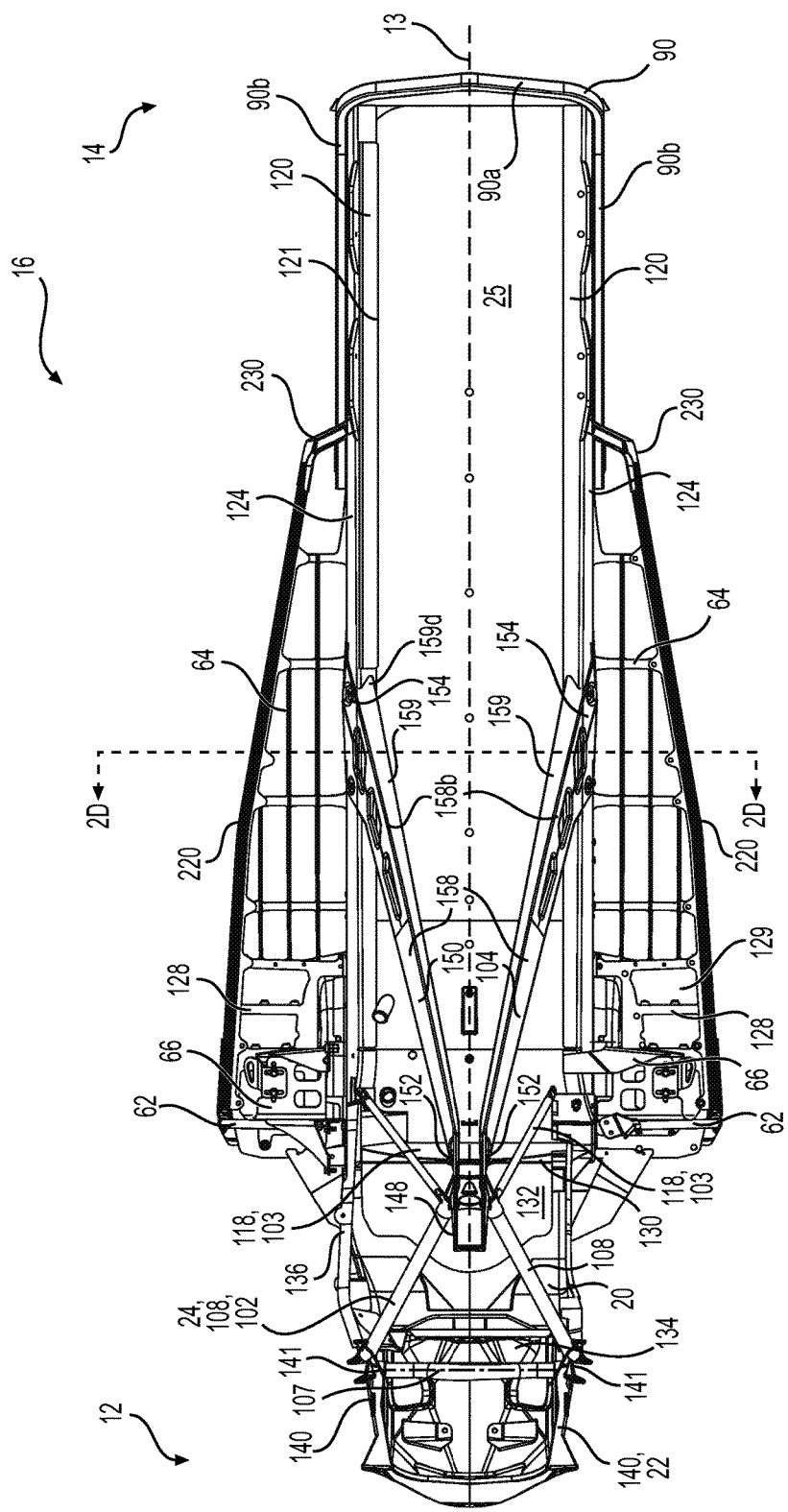
FIG. 2C is a top plan view of the snowmobile portion of FIG. 2A.
Figure 2D:
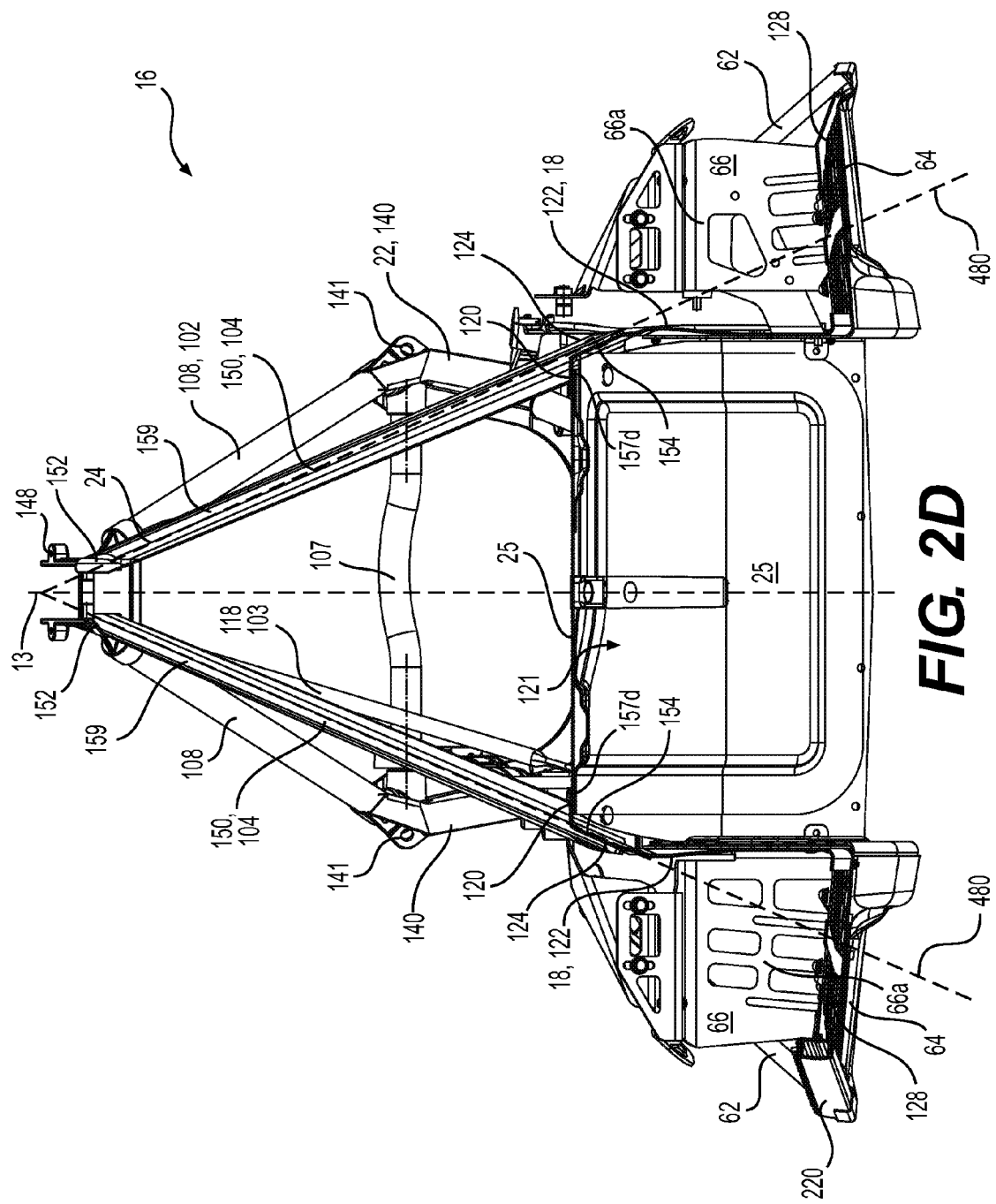
FIG. 2D is a cross-sectional view taken along the line 2D-2D of FIG. 2C.

As best seen in FIGS. 2D and 20, the tunnel 18 generally forms an inverted U-shaped structure when viewed from the front or back. With reference to FIGS. 2A to 2D, the tunnel 18 includes a top wall 120 extending generally horizontally, a left side wall 122 extending generally vertically and a right side wall 122 extending generally vertically. A left bevel wall 124 connects the left edge of the top wall 120 to the upper edge of the left side wall 122. A right bevel wall 124 connects the right edge of the top wall 120 to the upper edge of the right side wall 122. Each bevel wall 124 is planar and extends downwardly and laterally outwardly from the horizontal top wall 120 to the corresponding vertical side wall 122. Each bevel wall 124 forms an obtuse angle with the horizontal top wall 120. Each bevel wall 124 also forms an obtuse angle with the corresponding vertical side wall 122. Each bevel wall 124 allows for connection of a corresponding upper rear support leg 150 as will be described further below. A portion 125 is connected to each side tunnel wall 122 just below the bevel 124 for aesthetic purposes. It is however contemplated that the portion 125 could also be used to support the upper rear support leg 150. It is contemplated that the portion 125 could be omitted as in the implementation of the tunnel 18 shown in FIGS. 14 and 15. The tunnel 18 of FIGS. 14 and 15 instead has four trapezoidal openings 302. It is contemplated that the openings 302 could be omitted, configured differently than as shown herein and/or that the tunnel 18 could have fewer or more than four openings 302. It is also contemplated that the tunnel 18 could have one or more openings 302 as well as the portion 125.

As best seen in FIGS. 2A, 14 and 15, when viewed from a lateral side, the top wall 120 slopes gently upwardly from the front to the rear of the tunnel 18. It is contemplated that the entire length of the top wall 120 could be horizontal, or that there could be more than one slope along the length of the tunnel 18. It is also contemplated that a portion of the top wall 120 could be curved in a lateral or longitudinal direction. With reference to FIGS. 2B to 2D, the top wall 120 has a rectangular gap 121 extending longitudinally along the centerplane 13. The gap 121 extends from the rear end of the tunnel 18 towards the front end of the tunnel 18. It is contemplated that the gap 121 could be shaped and sized differently than as shown. The heat exchanger 25 is disposed in the gap 121 of the top wall 120. The coolant flowing through the heat exchanger 25 is cooled by cool air flowing along the upper surface of the heat exchanger 25 disposed in the gap 121 and the snow being thrown upwards onto the lower surface of the heat exchanger 25 by the track 40 disposed below the tunnel 18.

Figure 17:
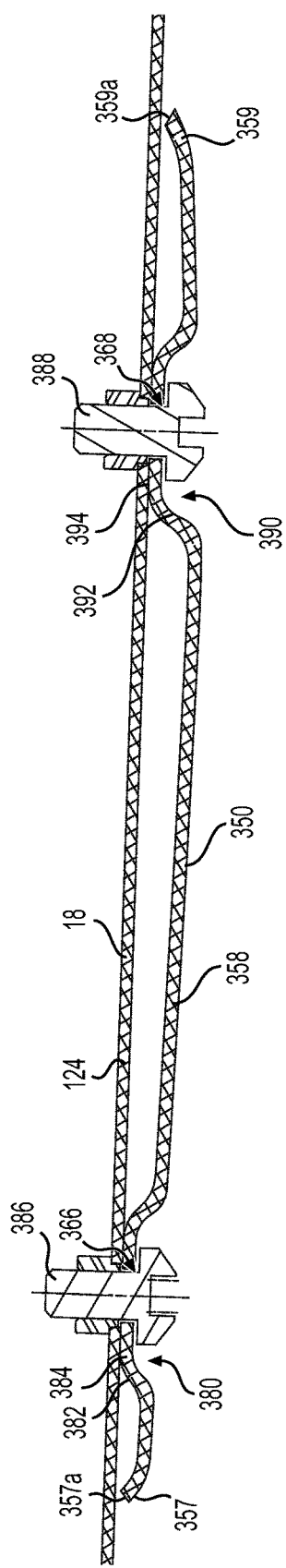
FIG. 17 is a cross-sectional view taken along the line 17-17 of FIG. 15.
Figure 18:
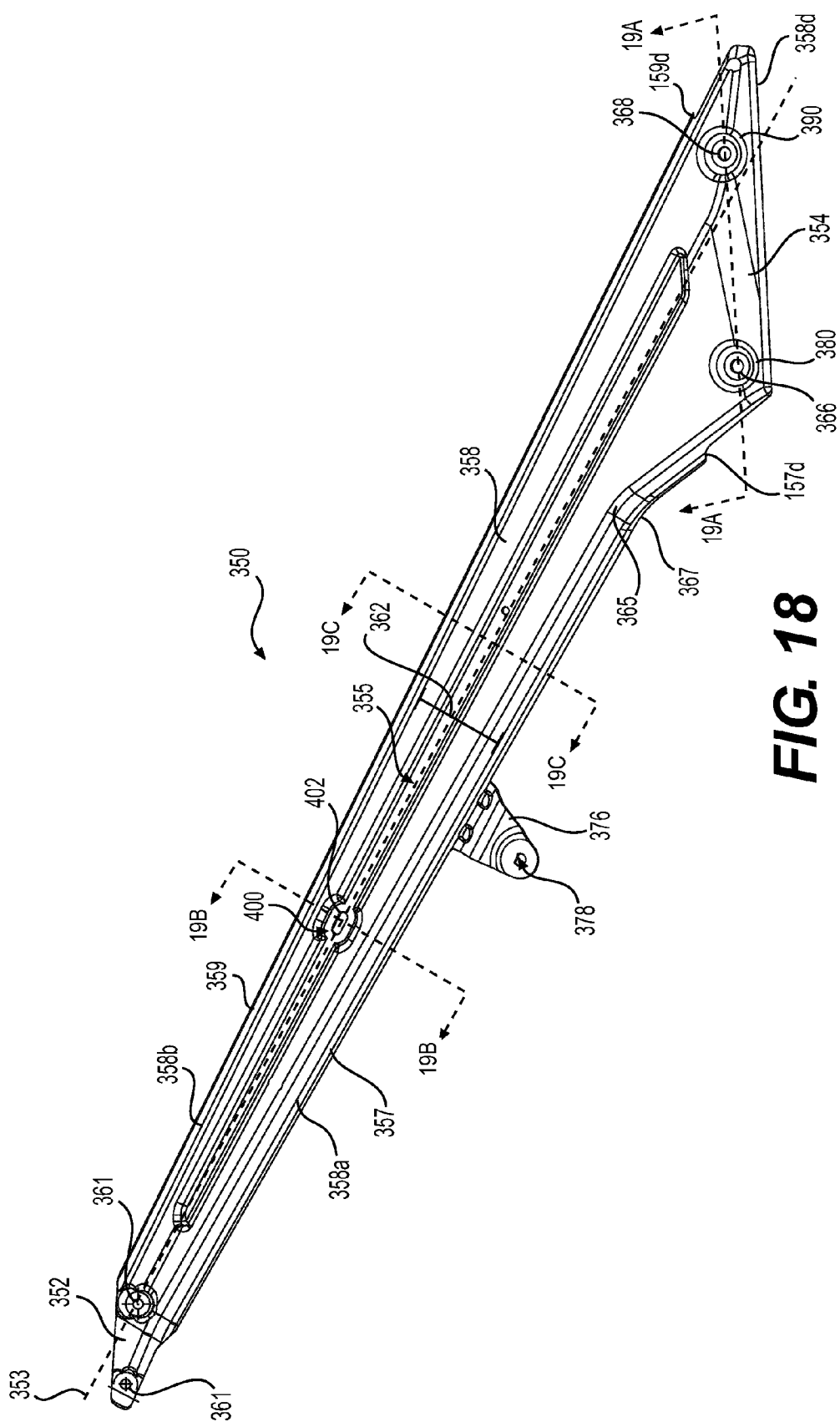
FIG. 18 is a left side elevation view of a left leg of an upper rear support of the frame of FIG. 14.

With reference to FIGS. 2A to 2C, 14, 15 and 20, a central horizontal arm 90a of the bumper 90 is disposed above the top tunnel wall 120 at a rear thereof and the heat exchanger 25. A left end of the horizontal arm 90a is connected to a downwardly and forwardly extending left arm 90b and its right end connected to a downwardly and forwardly extending right arm 90b. The left arm 90b extends downwardly and forwardly along the leftwardly facing (outer) surface of the left tunnel wall 122 to its bottom edge and then bends forward to extend along the outer surface of the left tunnel wall 122 just above the bottom edge thereof. The front end of the left arm 90b is disposed forward of the rear end of the left footrest 64. The front end of the left arm 90b is fastened to the left tunnel wall 122 by a fastener 146 (FIG. 20). The fastener 146 also connects a rear suspension attachment bracket 142 to the left tunnel wall 122 as can be seen in FIG. 20. The rear suspension attachment bracket 142 connects the rear suspension assembly 32 to the tunnel 18. The rear suspension attachment bracket 142 has a vertically extending plate 143 disposed against the rightwardly facing (inner) surface of the left tunnel wall 122. The fastener 146, in the form of a bolt, is inserted through the vertical plate 143, and the left tunnel wall 122 into the left arm 90b of the bumper 90. The vertical plate 143 extends lower than the bottom edge of the left tunnel wall 122. One of the idler wheels 36 is rotatably connected to the lower end of the rear suspension attachment bracket 142 as can be seen in FIG. 1. It is contemplated that an element other than the idler wheel 36 of the rear suspension assembly 32 could be connected to the rear suspension attachment bracket 142 in addition to, or instead of the idler wheel 36 as shown herein. The rear suspension attachment bracket 142 also includes a horizontally extending plate 144 extending laterally outwardly from a middle portion of the attachment bracket 142. The horizontal plate 144 is formed integrally with the vertical plate 143 and disposed just below the bottom edge of the left tunnel wall 122. The right tunnel wall 122 similarly has a right rear suspension attachment bracket 142 fastened to the inner surface by a fastener 146 with an idler wheel 36 being connected to the lower end of the rear suspension attachment bracket 142. Although not seen in the figures, the right arm 90*b* similarly extends downwardly and forwardly along the right tunnel wall 122 to its bottom edge, and then bends forward to extend along the bottom edge of the right tunnel wall 122. The front end of the right arm 90*b* is disposed forward of the rear end of the right footrest 64. As can be seen in FIG. 17, the front end of the right arm 90*b* is fastened to the right tunnel wall 122 and the right rear suspension attachment bracket 142 by the fastener 146 as described above for the front end of the left arm 90*b*.

With reference to FIGS. 2A, 2B, 14 and 15, a front portion of the left side wall 122 of the tunnel 18 has an opening 126 which receives the front drive axle 35. The front portion of the left side wall 122 around the opening 126 is reinforced for additional rigidity, as can be seen when viewed from a lateral side. The left footrest 64 extends leftwardly from the bottom edge of the left side wall 122, and the right footrest 64 extends rightwardly from the bottom edge of the right side wall 122. In some implementations of the tunnel 18, the entire length of the footrest 64 is formed integrally with the tunnel side surfaces 122. In the implementation of the tunnel 18 shown in FIGS. 2A to 2C, 14 and 15, a front portion 128 of each footrest 64 is formed integrally with the corresponding side wall 122. A toehold 66 extends upward from the front edge of each footrest 64. Each of the left and right toeholds 66 has a generally vertical front portion 66*a* that extends upwardly from the front edge of the footrest 64, a generally horizontal middle portion 66*b* that extends rearwardly from the top of the front portion 66*a* and a rear portion 66*c* that extends upwardly from the rear end of the middle portion 66*b*. A footrest support 62 connects the front end of each footrest 64 to a rear portion 130 of the engine cradle 20. In the implementation of the footrest 64 shown in FIGS. 14, 15, and 21, a rear end of the left footrest 64 is fastened to the horizontal plate 144 of the left rear suspension attachment bracket 142 and a rear end of the right footrest 64 is fastened to the horizontal plate 144 of the right rear suspension attachment bracket 142. The footrest 64 will be described in more detail below.

With reference to FIGS. 2A to 2C, the engine cradle 20 is attached to the front end of the tunnel 18 and extends forwardly therefrom. In the illustrated implementation of the engine cradle 20, the rear portion 130 of the engine cradle 20 extends generally vertically and is connected to the front of the tunnel 18. A generally horizontal bottom portion 132 of the engine cradle 20 extends forwardly from the bottom of the rear portion 130, and a generally vertical front portion 134 rises upwards from the bottom portion 132 of the engine cradle 20. The motor 50 is supported by the engine cradle 20 in a manner which would be determined by the size and shape of the motor 50. Engine cradles having different shapes and including components different than as described above are also contemplated. The motor 50 can be supported on the bottom portion 132 of the engine cradle 20 or can also be solely and/or simultaneously supported by other areas of the engine cradle 20, tunnel 18 and/or front suspension module 22. On the right side of the engine cradle 20, as best seen in FIGS. 2A and 2C, a generally horizontal upper bar 136 extends between the upper ends of the front and rear portions 134, 130 of the engine cradle 20. The upper bar 136 is spaced from the generally horizontal bottom portion 132 in order to provide additional structural rigidity to the engine cradle 20. In the illustrated implementation, although not shown for clarity, an upper bar is also provided on the left side of the engine cradle 20 connecting the front and rear portion 134, 130 and being spaced from the bottom portion 132. It is contemplated that the engine cradle 20 could be configured differently than as shown herein.

With reference to FIGS. 2A to 2C, 14 and 15, the front suspension module 22, which attaches the front suspension assembly 16 to the snowmobile 10, is attached to the front portion 134 of the engine cradle 20. The front suspension module 22 extends forwardly from the engine cradle 20. The front suspension module 22 includes left and right front suspension mounting brackets 140. Each bracket 140 forms an inverted generally V-shaped structure extending forwardly from the front portion 134 of the engine cradle 20. The corresponding front suspension assembly 72 is attached to each front suspension mounting bracket 140. Other types of suspension mounting brackets are also contemplated to accommodate a different type of front suspension assembly 72. The front suspension module 22 and the engine cradle 20 also support a portion of an exhaust system (not shown) connected to the engine 50.

With reference to FIGS. 2A to 2D, 14 and 15, the upper support structure 24 includes an upper front support 102, an upper column 103, and an upper rear support 104. The upper front support 102 includes left and right front support braces 108. The lower end of each of the left and right front support braces 108 is attached to the corresponding one of the left and right front suspension mounting bracket 140 at its upper end (apex of the inverted V-shaped bracket 140). A laterally extending frame member 107 connects between the lower ends of the two front support braces 108. The frame member 107 is also connected to the top of the front suspension mounting brackets 140. The apex of the left mounting bracket 140, the left end of the frame member 107 and the bottom end of the left front support brace 108 are connected together at a common connection point 141 on the left side. Similarly, the apex of the right mounting bracket 140, the right end of the frame member 107 and the bottom end of the right front support brace 108 are connected together at a common connection point 141 on the right side. Each front support brace 108 extends upwards, rearwards and laterally inwards to a steering bracket 148 positioned above the engine cradle 20. The steering column 82 is rotatably inserted through the steering bracket 148 between the braces 108. The steering column 82 extends downwards and forwards from the handlebar 84 through the steering bracket 148 to the front suspension assembly 72 (connection not shown in figures) for rotating the skis 70 and steering the snowmobile 10. In the implementation of the frame 16 shown in FIGS. 14 and 15, the steering bracket 148 does not extend as far forwardly of the upper end of the braces 108 as the steering bracket 148 of the frame 16 in FIGS. 2A to 2D. The steering bracket 148 of FIGS. 14 and 15 also does not extend as far forwardly of the upper end of the braces 108 as steering bracket 148 of FIGS. 2A to 2D. The front support braces 108 are formed as extruded hollow tubes made of metal or other suitably strong materials, however, the disclosure is not intended to be limited to this particular material, assembly method or configuration. For example, it is contemplated that the forward support braces 108 could have a different cross-section or be made by molding or casting. It is also contemplated that the forward support braces 106 may be constructed according to a monocoque or pseudo-monocoque technique instead of having a tubular construction as in the illustrated implementation.

With reference to FIGS. 2A to 2C, 14 and 15, an upper column 103 connects the forward support braces 108 to the engine cradle 20. The upper column 103 includes a left leg 118 and a right leg 118. The upper end of the left leg 118 is connected to the left front support brace 108 just below the upper end of the left front support brace 108 which is connected to the steering bracket 148. From the left front support brace 108, the left leg 118 extends downwardly, rearwardly and leftwardly to the upper left hand corner of the engine cradle rear portion 130. The upper end of the right leg 118 is similarly connected to the right front support brace 108 just below the upper end of the right front support brace 108 which is connected to the steering bracket 148. From the right front support brace 108, the right leg 118 extends downwardly, rearwardly and rightwardly to the upper right hand corner of the engine cradle rear portion 130. In the illustrated implementation, each of the upper column legs 118 is in the form of a straight, tubular rod, but it is contemplated that the legs 118 could also have a bend or a curve. For example, each leg 118 could extend upwardly from the engine cradle 20 and then laterally inwardly to the steering bracket 148. It is also contemplated that the legs 118 could not be tubular, for example, the legs 118 could be in the form of a solid rod. It is further contemplated that the upper column could be constructed as a single inverted U-shaped structure having two legs 118.

The upper rear support 104 will now be described with reference to FIGS. 3 to 5B. The upper rear support 104 includes a pair of rear support legs 150, referred to hereinafter as legs 150, for convenience. The left leg 150 is similar to a mirror image of the right leg 150 and as such, corresponding features of the left and right legs 150 have been labelled with the same reference numbers, and only the left leg 150 will be described herein.

Figure 3:
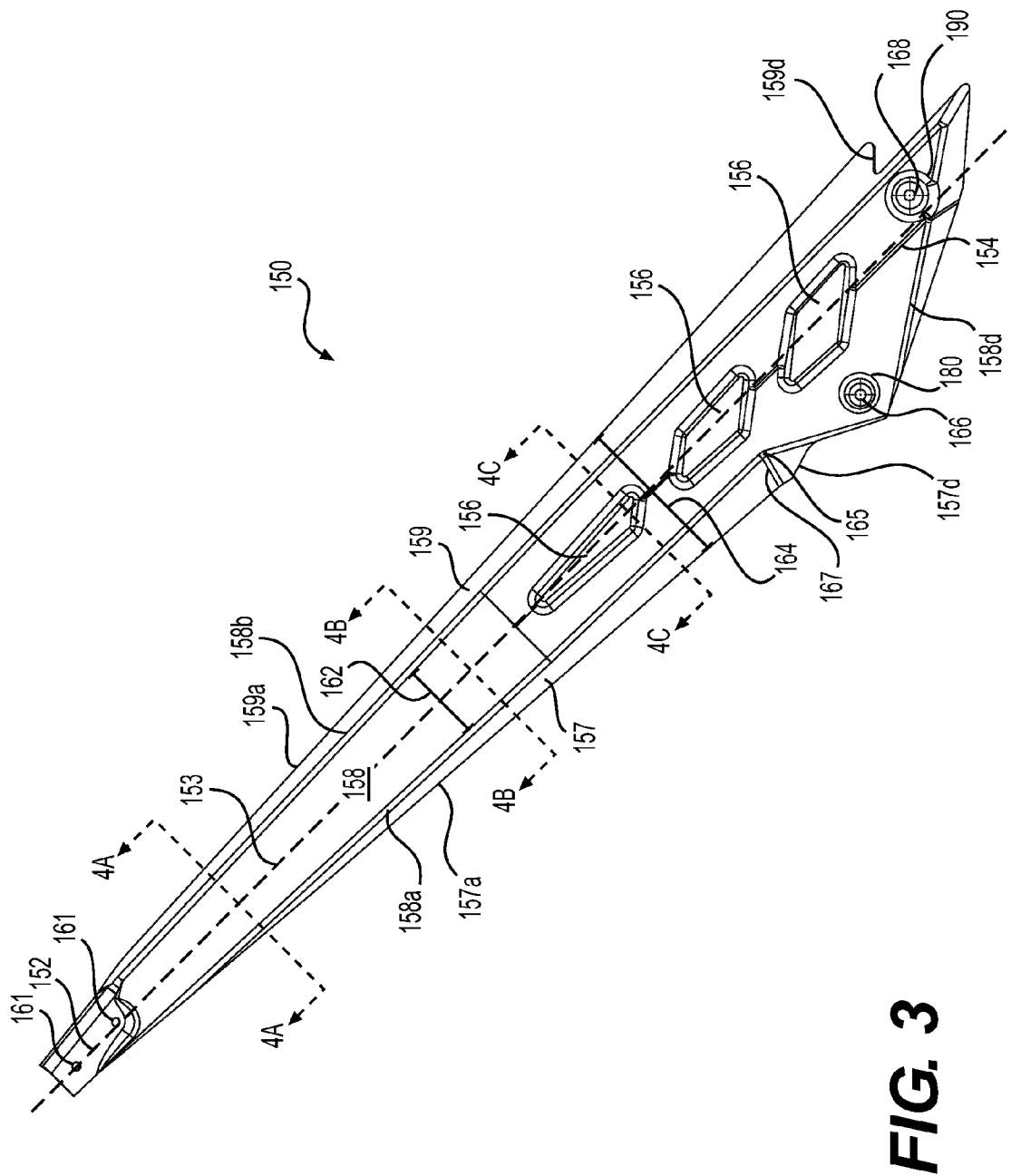
FIG. 3 is a left side elevation view of a left leg of an upper rear support of the frame of the snowmobile of FIG. 1.

As can be seen in FIG. 3, the leg 150 has an upper end 152 and a lower end 154. With reference to FIG. 2A, the upper end 152 of the leg 150 is disposed longitudinally rearward of the upper end of the upper column leg 118 and longitudinally forward of the lower end thereof. The upper end 152 is connected to the steering bracket 148. The lower end 154 is connected to the bevel wall 124 in a middle portion of the tunnel 18 between the front and rear ends of the tunnel 18. The fuel tank 52 and seat 60 are connected to a middle portion of the legs 150 between the upper and lower ends, 152 and 154, thereof as can be seen in the implementation of the leg 350 shown in FIGS. 14 and 15. The connection of the seat 60 and fuel tank 52 will be described below in further detail with respect to FIGS. 14 to 19B.

With reference to FIGS. 4A to 4C, between the upper and lower ends 152 and 154, the leg 150 has a C-shaped cross-section with an open channel 160 facing laterally inwardly towards the opposite (right) leg 150. The channel 160 is defined by a front wall 157, a side wall 158, and a rear wall 159. A left side portion of the fuel tank 52 is disposed in the channel 160 as can be seen in the implementation of the leg 350 shown in FIGS. 14 to 20. The leg 350, and the connection thereto of the fuel tank 52 and seat 60 will be described below in further detail.

With reference to FIG. 3, the side wall 158 is generally planar below the upper end 152. The side wall 158 extends generally longitudinally between a front edge 158a and a rear edge 158b. The side wall 158 has a lower edge 158d which extends from the front edge 158a to its rear edge 158b. The lower edge 158d is disposed generally parallel to the top wall 120 of the tunnel 18 when the rear leg 150 is mounted to the tunnel 18. A through-hole 166 is defined in a recess 180 disposed near the front corner of the side wall 158 between the front edge 158a and the lower edge 158d. Another through-hole 168 is defined in a recess 190 disposed near the rear corner of the side wall 158 between the rear edge 158b and the lower edge 158d. Bolts 186, 188 are respectively inserted through the holes 166, 168 to connect the side wall 158 to the bevel wall 124 of the tunnel 18 as can be seen in FIG. 2A. The angle, with respect to the vertical, of the bevel wall 124 of the tunnel 18 generally corresponds to the inclination angle of the side wall 158, with respect to the vertical. The side wall 158 can thus be directly fastened to the bevel wall 124 without using any additional brackets. The recesses 180, 190 and the connection of the leg 350 to the bevel wall 124 will be described further below with respect to the implementation of the leg 350 shown in FIGS. 14, 15 and 17.

With reference to FIG. 3, a number of apertures 156 are defined in the middle portion of the side wall 158 to reduce the weight of the leg 150. The apertures 156 are formed by punching the side wall 158. The side wall 158 bends laterally inwardly around the edges of each aperture 156 as can be seen in FIG. 4C to form a flange around the aperture 156. The flanged apertures 156 increase the rigidity of the leg 150.

With reference to FIG. 3, the side wall 158 tapers towards the upper end 152. The front and rear edges 158a, 158b of the side wall 158 define a side wall width 162 therebetween. The side wall width 162 is measured perpendicular to a centerline 153 of the side wall 158. As the side wall 158 extends downwardly from its upper end 152, its front edge 158a moves further away from its rear edge 158b. The side wall width 162 thus increases from the upper end 152 towards its lower edge 158d. The rear edge 158b is linear while the front edge 158a is linear above and below a bend 165 near the lower end 154. Below the bend 165, the front edge 158a moves further away from the rear edge 158b such that the side wall width 162 increases abruptly at the bend 165.

With reference to FIGS. 3 to 4C, the front wall 157 extends laterally inwardly from the front edge 158a of the side wall 158 to an inner edge 157a. The front wall 157 has a lower edge 157d that is spaced from the side wall lower edge 158d. As best seen in FIG. 2A, the front wall lower edge 157d is adjacent the top wall 120 of the tunnel 18. The front wall 157 has a bend 167 (FIG. 3) connected to the bend 165 of the side wall front edge 158a. The front wall 157 is generally planar above the bend 167. It is contemplated that the entire length of the front wall 157 could be planar.

With reference to FIGS. 3 to 4C, the rear wall 159 extends laterally inwardly from the rear edge 158a of the side wall 158 to an inner edge 159a. The rear wall 159 is also generally planar between the upper and lower ends 152, 154. The rear wall 159 has a lower edge 159d that is spaced from the lower edge 158d of the side wall 158. As best seen in FIG. 2A, the rear wall lower edge 159d is adjacent the top wall 120 of the tunnel 18.

With reference to FIGS. 4A to 4C, the front wall 157 and the rear wall 159 extend from the side wall 158 at an obtuse angle but it is also contemplated that the front and rear walls 157, 159 could be perpendicular to the side wall 158. A width 164 of the leg 150 can be defined between the inner edge 157a of the front wall 157 and the inner edge 159a of the rear wall 159 and measured in a plane perpendicular to the side wall 158 in a direction perpendicular to the centerline 153. The leg width 164 also increases from its upper end 152 towards its lower end 154.

Figure 5B:
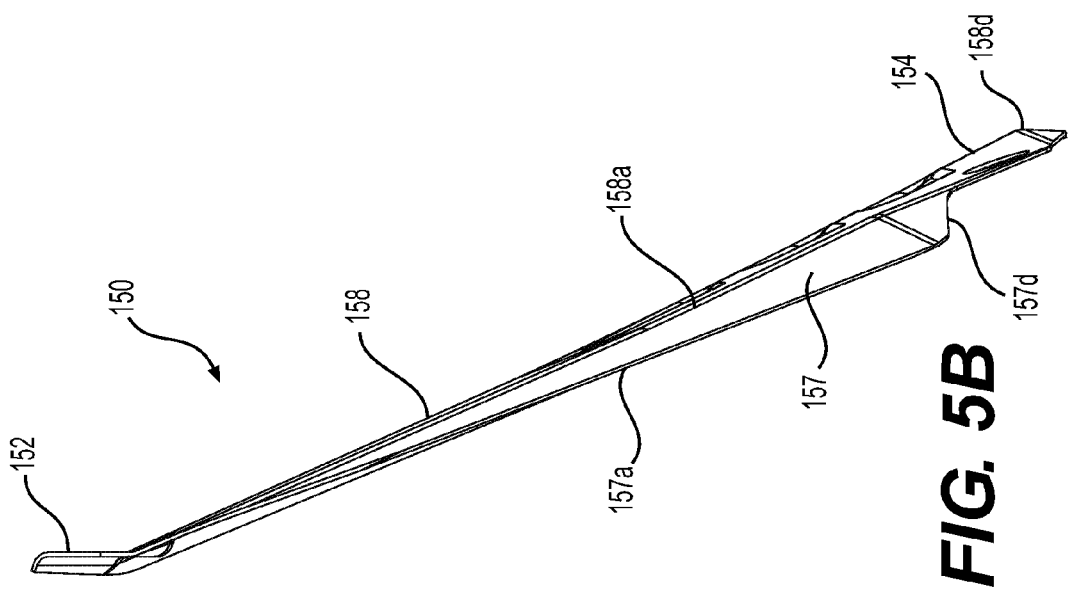
FIG. 5B is a front elevation view of the left leg of FIG. 3.
Figure 5A:
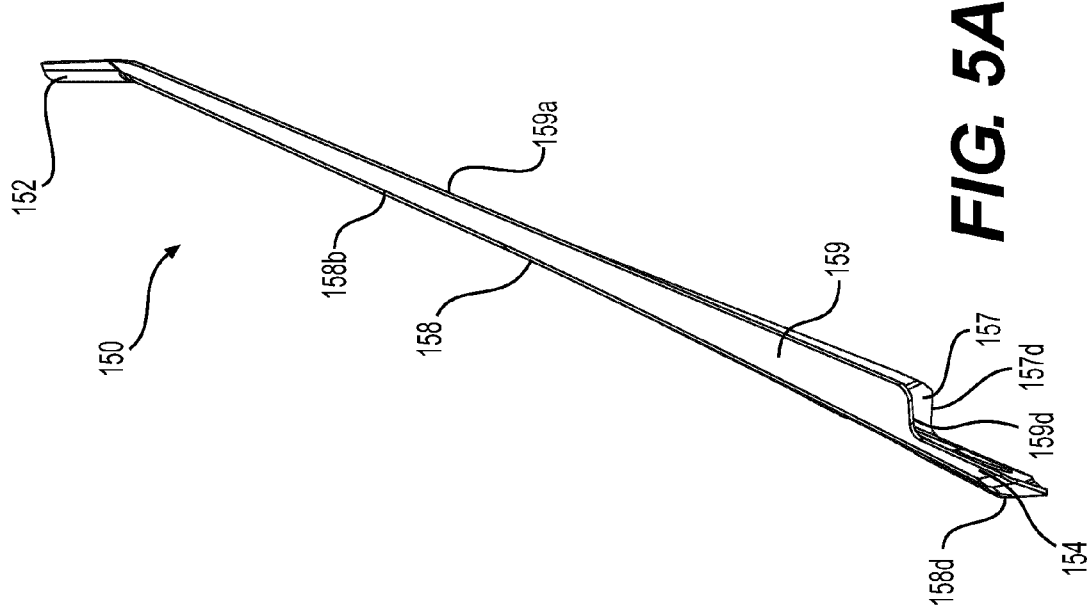
FIG. 5A is a rear elevation view of the left leg of FIG. 3.

With reference to FIGS. 2C, 5A and 5B, the leg 150 extends generally vertically and longitudinally in the upper end 152 but does not extend laterally inwardly. It is contemplated that the upper end of the leg 150 could also extend laterally inwardly. The longitudinally extending surface in the upper end 152 is also recessed in a laterally inward direction. A pair of through-holes 161 is defined in the upper end 152. Bolts (not shown) are inserted into the through-holes 161 for fastening the steering bracket 148 to the leg 150. It is contemplated that the upper end 152 could be structured differently than as shown herein.

Another implementation of an upper rear support 104 having legs 150' will now be described with reference to FIGS. 6 to 7C. The left leg 150' is similar to a mirror image of the right leg (not shown) and as such only the left leg 150' is shown and described herein. In addition, the left leg 150' is similar to the left leg 150 described above. Corresponding features of the legs 150, 150' have been labeled with the same reference numbers and will only be discussed herein with respect to their differences.

Figure 6:
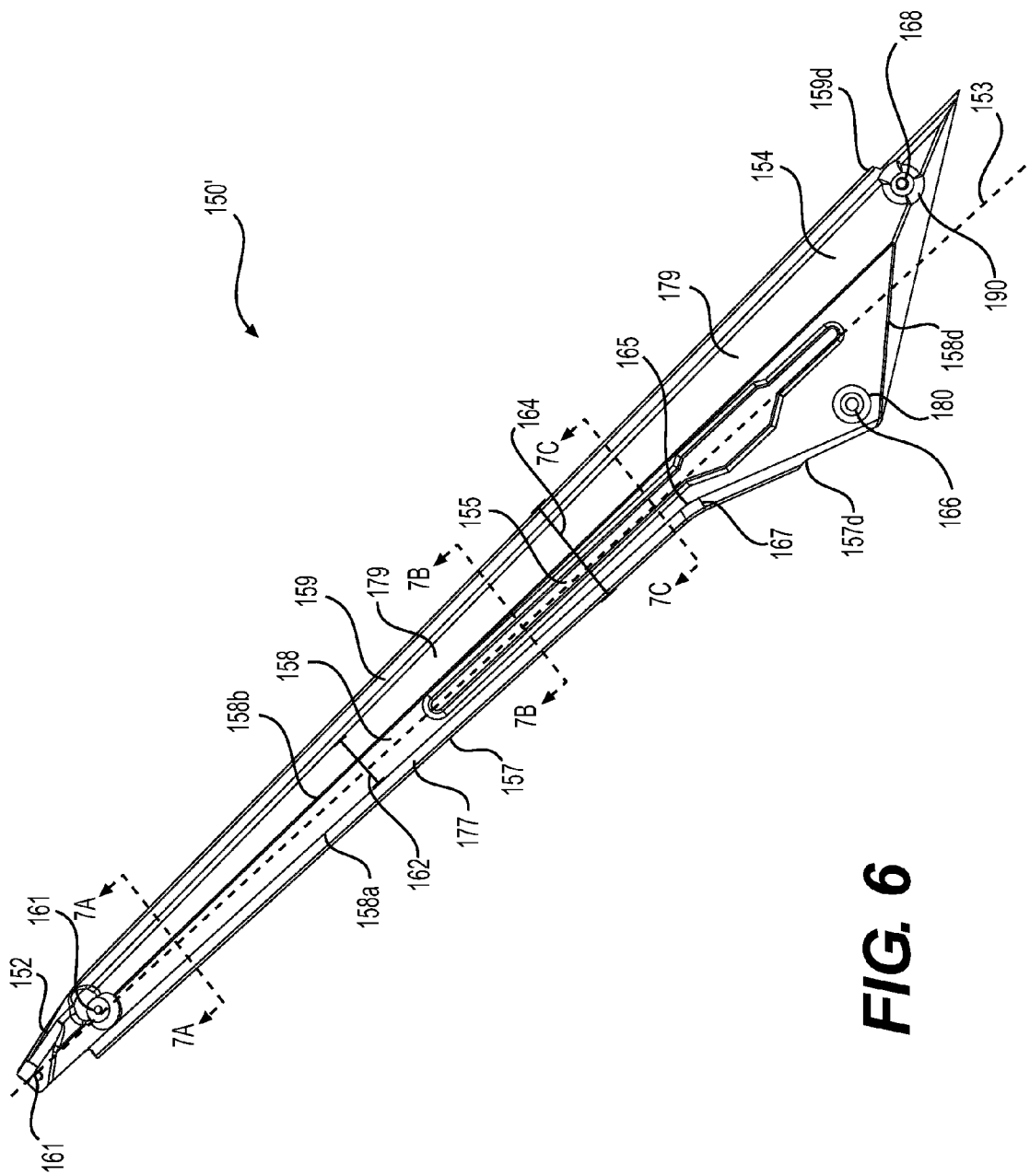
FIG. 6 is a left side elevation view of a left leg according to another implementation.

With reference to FIG. 6, the left leg 150' has an upper end 152 and a lower end 154, a front wall 157, a rear wall 159 and a side wall 158 extending therebetween.

The side wall 158 of the leg 150' is generally similar to the side wall 158 of the leg 150 except that the apertures 156 have been omitted from the leg 150' and a shallow elongated recess 155 has been added to the side wall 158 of the leg 150'. The elongated recess 155 extends upwards from the lower end 154 to a middle portion of the side wall 158. The recess 155 is disposed closer to the front edge 158a than to the rear edge 158b but it is contemplated that the recess 155 could be centered between the edges 158a, 158b or disposed closer to the rear edge 158b. The elongated recess 155 has a uniform width except for a wider portion disposed closer to the lower end 154. The shape and size of the recess 155 could be different than as shown herein. The recess 155 could be formed as multiple recesses, and/or additional recesses could also be provided in a different location along the side wall 158.

Figure 7:
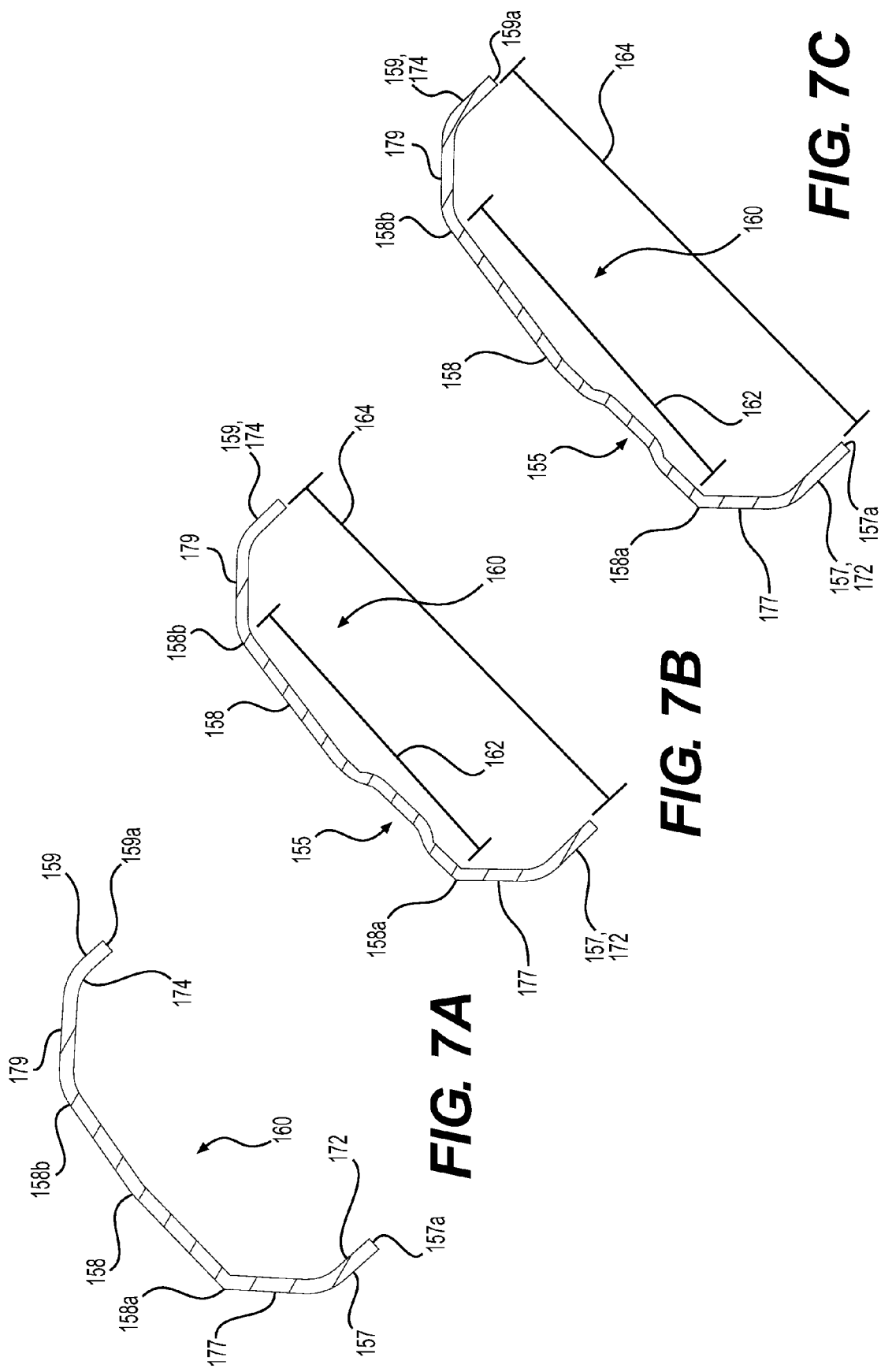
FIG. 7A is a line section taken along the line 7A-7A of FIG. 6.
FIG. 7B is a line section taken along the line 7B-7B of FIG. 6.
FIG. 7C is a line section taken along the line 7C-7C of FIG. 6.

With reference to FIGS. 6 to 7C, the front wall 157 of the leg 150' has a first planar portion 177 extending laterally inwardly from the front edge 158a and a second planar portion 172 extending laterally inwardly from the first planar portion 177 to a laterally inner edge 157a of the front wall 157. The first planar portion 177 is disposed at an obtuse angle with respect to the planar side wall 158 and the second planar portion 172 is disposed generally perpendicular to the planar side wall 158. The first planar portion 177 therefore forms an angled front bevel wall 177 of the rear leg 150'. The rear wall 159 similarly has a first planar portion 179 extending laterally inwardly from the rear edge 158b and a second planar portion 174 extending laterally inwardly from the first planar portion 179 to a laterally inner edge 159a of the rear wall 159. The first planar portion 179 is disposed at an obtuse angle with respect to the planar side wall 158 and the second planar portion 174 is disposed generally perpendicular to the planar side wall 158. The first planar portion 179 therefore forms an angled rear bevel wall 177 of the rear leg 150'. It is contemplated that the front and rear bevel walls 177, 179 could each be disposed at a different angle with respect to the planar side wall 158 than as shown herein. It is also contemplated that either or both of the first planar portions 177, 179 could not be disposed generally perpendicular to the side wall 158.

Thus, the leg 150' of FIGS. 6 to 7C also has a generally C-shaped cross-section, but the C-shaped cross-section is formed by five generally planar surfaces 172, 177, 158, 179, and 174 instead of three generally planar surfaces 157, 158, and 159 as in the leg 150 of FIGS. 3 and 4. As the shape of the channel 160 defined by the rear leg 150' is slightly different from that of the channel 160 defined by the rear leg 150, the fuel tank (not shown) used with the rear leg 150' has a side portion disposed in the channel 160 and congruous with the inward facing surfaces of the walls 172, 177, 158, 179, 174 that is slightly different from the side portion of the fuel tank 52 used with the implementation of the rear leg 150.

With reference to FIGS. 6 to 7C, a leg width 164 can also be defined for the leg 150'. The leg width 164 is measured between the laterally inner edge 157a of the front wall 157 and the laterally inner edge 159a of the rear wall 159 in a plane perpendicular to both walls 157, 159. The leg width 164 increases from the upper end 152 toward the lower end 154.

The upper rear support 104 of FIGS. 14 and 15 has another implementation of legs 350 which will now be described with reference to FIGS. 14 to 21.

The left leg 350 is generally a mirror image of the right leg 350 (FIG. 21), and as such only the left leg 350 is described herein. In addition, the left leg 350 is similar to the left leg 150' described above. As such, features of the leg 350 have been labeled with the same reference numbers as the corresponding features of the leg 150', except that the first digits of the reference number have each been changed from "1" to "3". The left leg 350 will only be described herein in detail with respect to some of the differences with the left leg 150' discussed above.

With reference to FIG. 14, the upper end 352 of the leg 350 is generally longitudinally aligned with the upper end of the upper column leg 118 and is disposed longitudinally forwardly of the lower end thereof. The leg 350 is connected to the steering bracket 148 by two bolts (not shown) inserted through through-holes 361 (FIG. 18) defined in the upper end 352.

A bracket 376 extends downwardly from the edge 157a of the front wall 157. The bracket 376 is generally triangular in shape and disposed in the middle portion of the leg 350, closer to the lower end 354 than to the upper end 352. The bracket 376 has a through-hole 378 formed therein and is used to connect a panel (not shown) of the fairings 94 to the left leg 350.

The lower end 354 of the leg 350 is connected to the bevel surface 124 in a middle portion of the tunnel 18 between the front and rear ends of the tunnel 18. In the lower end 354, the side wall 358 has a recess 380 (similar to the recess 180 of the legs 150, 150') disposed near the front corner defined by the front edge 358a and the lower edge 358d, and a recess 390 (similar to the recess 190 of the legs 150, 150') disposed near the rear corner defined by the rear edge 358b and the lower edge 358d.

Figure 19A:
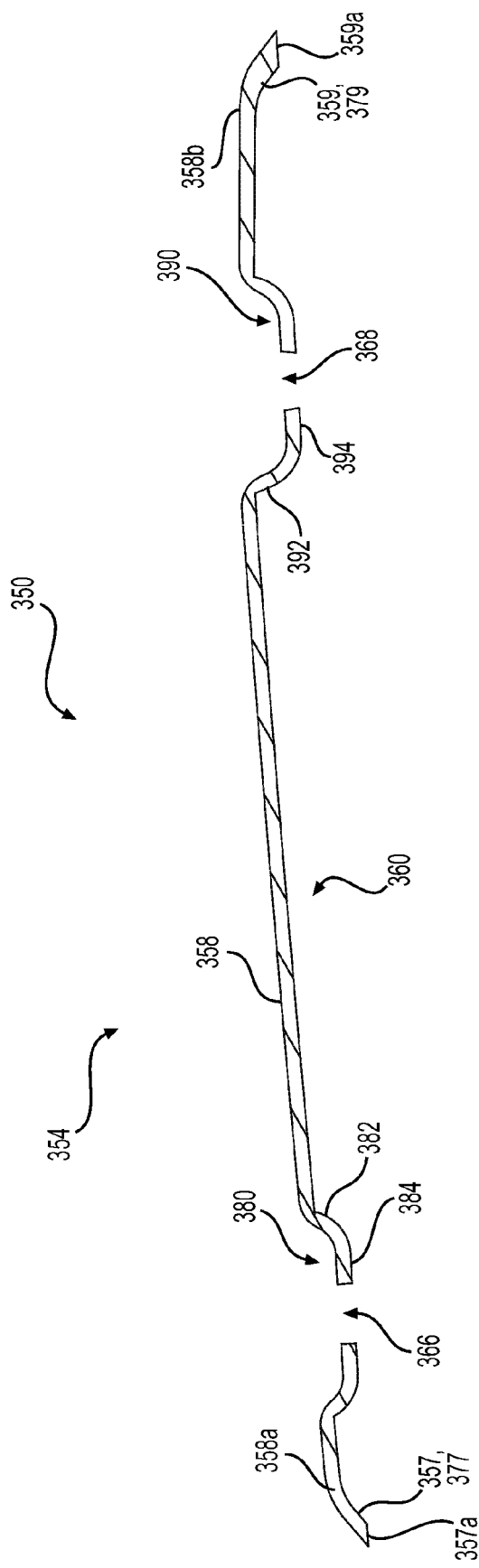
FIG. 19A is a slice taken along the line 19A-19A of FIG. 18.
Figure 19C:
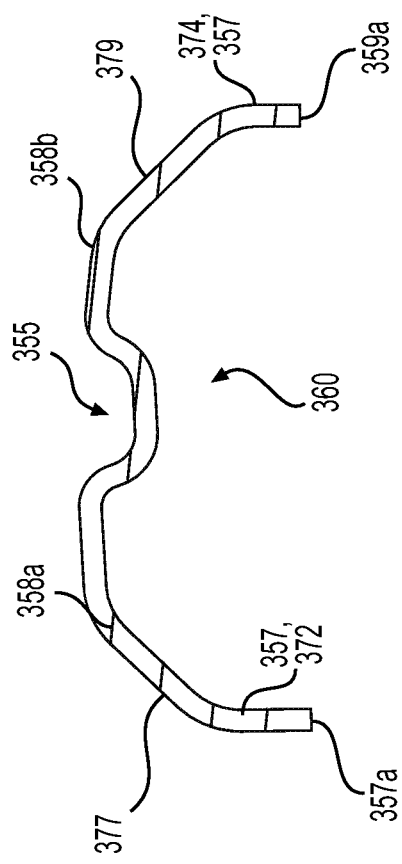
FIG. 19C is a slice taken along the line 19C-19C of FIG. 18.
Figure 19B:
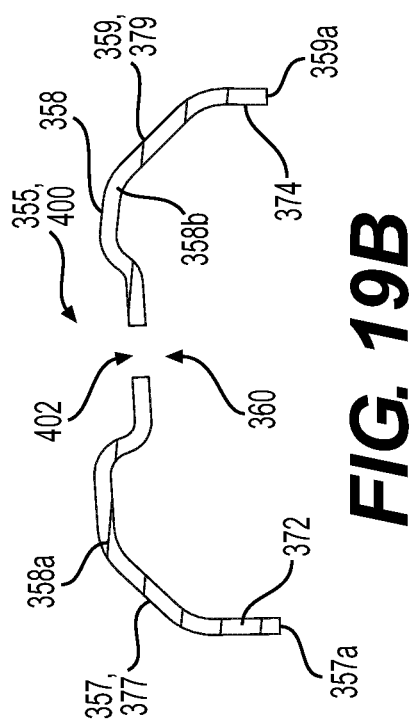
FIG. 19B is a slice taken along the line 19B-19B of FIG. 18.
Figure 20:
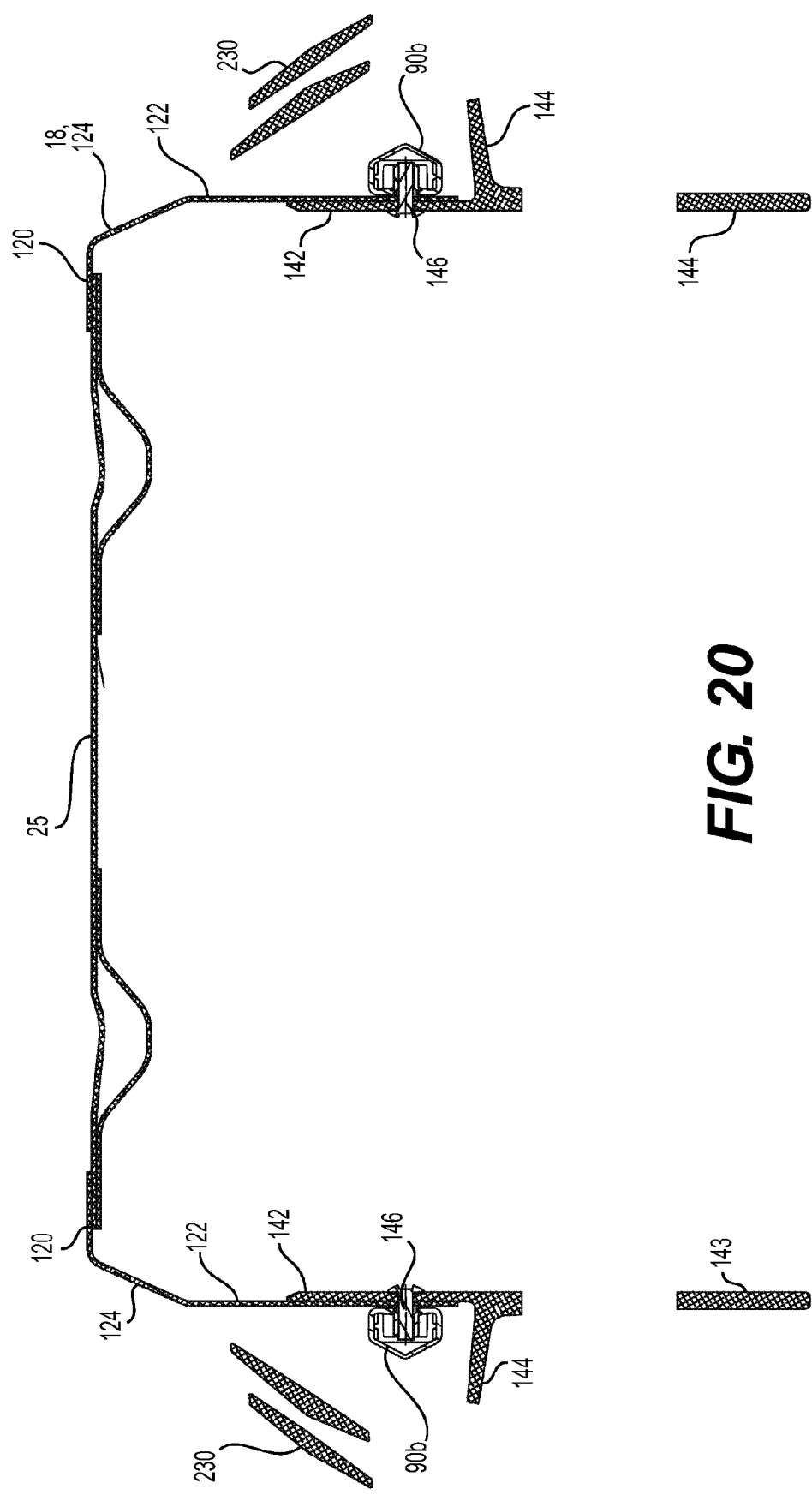
FIG. 20 is a slice taken along the line 20-20 of FIG. 15.

With reference to FIG. 19A, the recess 380 is circular and defined by a planar inner wall 384 and a cylindrical peripheral wall 382. The inner wall 384 is spaced from the planar side wall 358 and disposed laterally inwardly thereof. The inner wall 384 extends generally parallel to the planar portion of the side wall 358. The peripheral wall 382 extends laterally outwardly from the edge of the inner wall 384 to the planar portion of the side wall 358. A through-hole 366 is defined in the inner wall 384 of the recess 380. A bolt 386 is inserted through the hole 366 to fasten the leg 350 to the bevel surface 124 of the tunnel 18 as can be seen in FIG. 17.

The recess 390 is similarly circular and defined by a planar inner wall 394 and a cylindrical peripheral wall 392. The inner wall 394 is spaced from the planar side wall 358 and disposed laterally inwardly thereof. The inner wall 394 extends generally parallel to the planar portion of the side wall 358. The peripheral wall 392 extends laterally outwardly from the edge of the inner wall 394 to the planar portion of the side wall 358. A through-hole 368 is defined in the planar wall 394 of the recess 390. A bolt 388 is inserted through the hole 368 to fasten the leg 350 to the bevel surface 124 of the tunnel 18 as can be seen in FIG. 17.

As can be seen in FIG. 17, when the leg 350 is mounted to the tunnel 18, the bevel surface 124 is in contact with the planar inner recess walls 384, 394 and spaced from the planar portions of the side wall 358 in the lower end 354. In the illustrated implementation, the planar side wall 358 along the entire length of the leg 350 below the upper end 352 extends generally parallel to the bevel surface 124. It is contemplated that the planar side wall 358 could not be parallel to the inner recess walls 384, 394 and the bevel surface 124.

Figure 21:
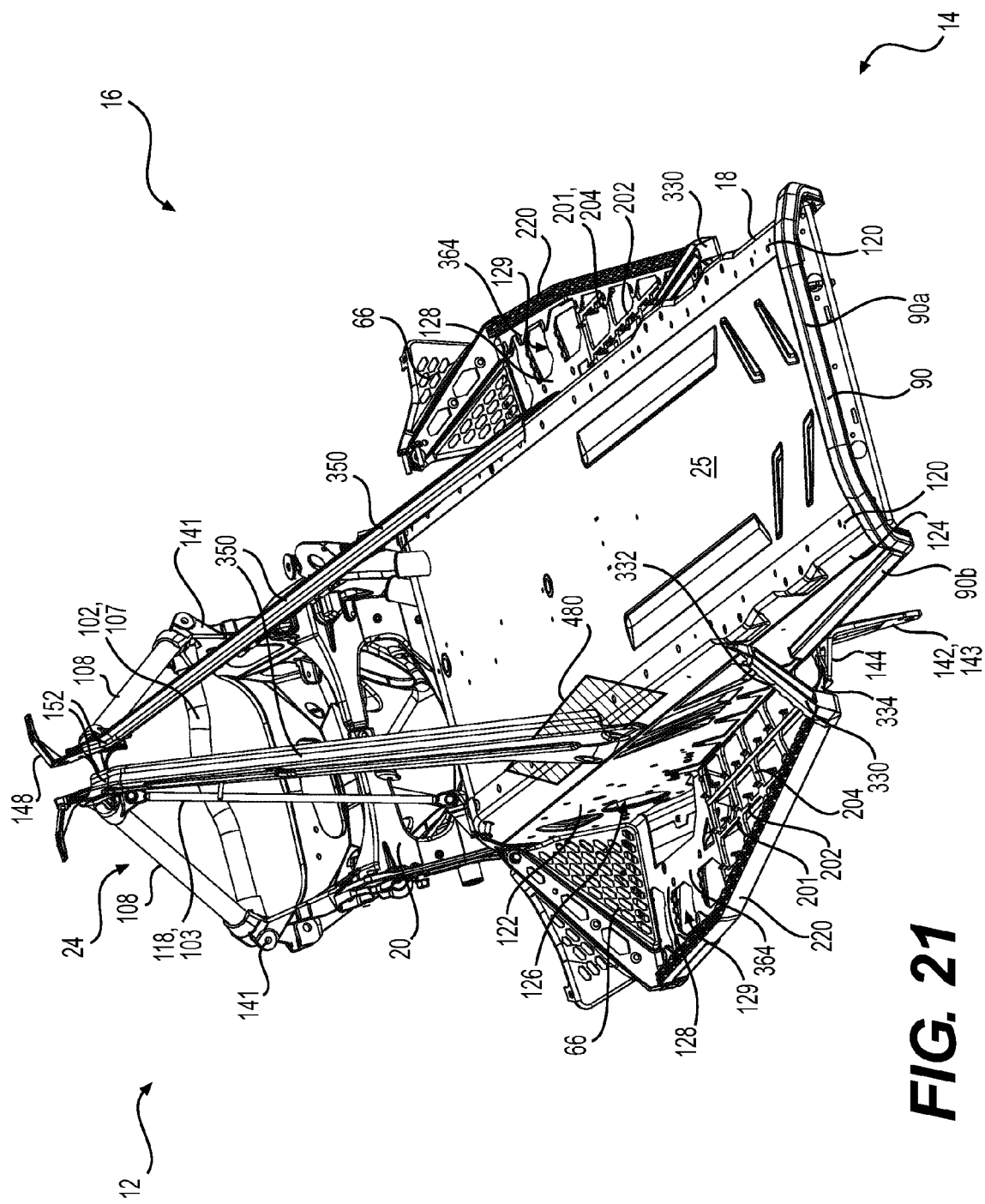
FIG. 21 is a perspective view, taken from a rear, top and left side, of the frame and footrests of FIG. 14.

As can be seen in FIG. 17, below the top surface 120 of the tunnel 18, inner edges 357a and 359a of the walls 357 and 359 extend laterally inwards from the side wall 358 towards the bevel wall 124. In the illustrated implementation, the bevel wall 124 does not contact the edges 357a, 359a of the front and rear wall 357, 359. It is contemplated that the edges 357a, 359a could contact the bevel wall 124. Above the top wall 120 of the tunnel 16, the edges 357a, 359a of the front and rear walls 357, 359 are spaced further from the side wall 358 than they are below the top wall 120. As can be seen in FIG. 21, above the tunnel 18, the inner edge 357a is disposed laterally inwardly of a left bevel plane 480 containing the left bevel wall 124. The left bevel plane 480 intersects the front and rear walls 357, 358 of the left leg 350 above the tunnel 18 such that the side wall 358 is disposed on an opposite of the left bevel plane 480 than the inner edges 357a, 359a. Although not shown for the leg 350, a right bevel plane 480 (FIG. 2D) containing the right bevel wall 124 similarly intersects the front and rear walls 357, 358 of the right leg 350 above the tunnel 18.

As can be seen in FIG. 2D, the left bevel plane 480 also intersects the front and rear walls 157, 159 of the left leg 150 above the tunnel 18 such that the side wall 158 is disposed on an opposite of the right bevel plane 480 than the inner edges 157a, 159a of the left leg 150. The right bevel plane 480 similarly intersects the front and rear walls 157, 159 of the right leg 150 above the tunnel 18 such that the side wall 158 is disposed on an opposite of the right bevel plane 480 than the inner edges 157a, 159a of the right leg 150. The inner edges 157a, 159a are disposed laterally inwardly of the corresponding one of the left and right bevel plane 480. As can be seen in FIG. 2D, the intersection of the left bevel plane 480 with the rear wall 159 of the left leg 150 extends along the entire length of the left leg 150 above the tunnel 18. Although not shown, the intersection of the right bevel plane 480 with the front wall 157 extends along the entire length of the left leg 150 above the tunnel 18. Although not shown, the intersection of the left bevel plane 480 with the front wall 157 extends along the entire length of the left leg 150 above the tunnel 18. Similarly, the intersection of the right bevel plane 480 with the front and rear walls 157, 159 extends along the entire length of the right leg 150 above the tunnel 18. It is contemplated that the intersection of each of the left and right bevel walls 480 with the front and rear walls 157, 159 could extend along only a portion of the corresponding leg 150 above the tunnel 18.

With reference to FIGS. 14 and 15, the planar side wall 358 has an elongated recess 355 extending between the front and rear edges, 358a and 358b, and between the upper and lower ends, 352 and 354. The upper end of the recess 355 is disposed just below the upper end 352 of the leg 350 and the lower end of the recess 355 is disposed just above the lower end 354. The recess 355 has a wider portion 400 which has a through-hole 402 defined therein. The wider portion 400 is disposed slightly higher than the bracket 376 of the leg 350.

Figure 16A:
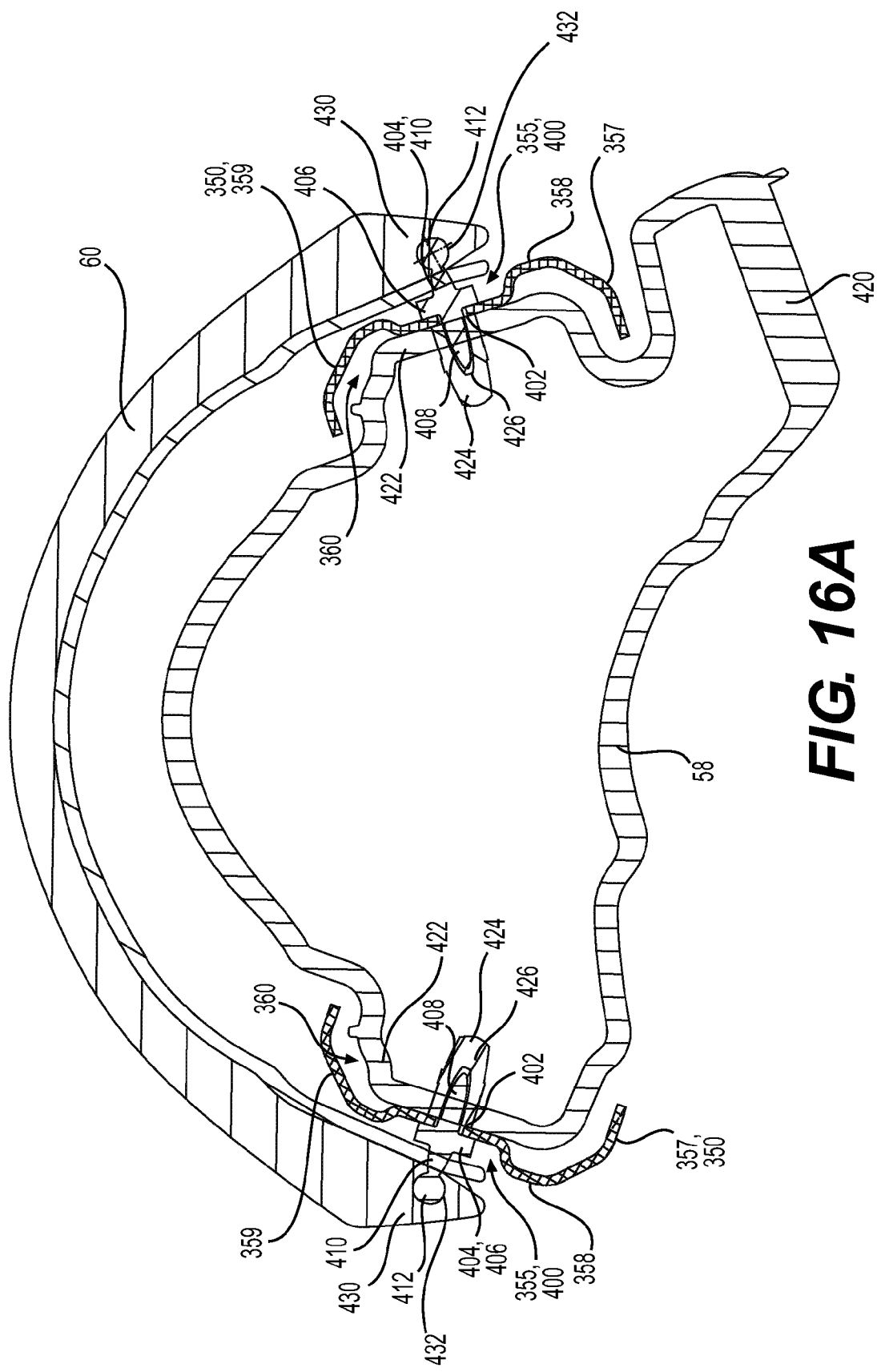
FIG. 16A is a cross-sectional view taken along the line 16A-16A of FIG. 14.
Figure 16B:
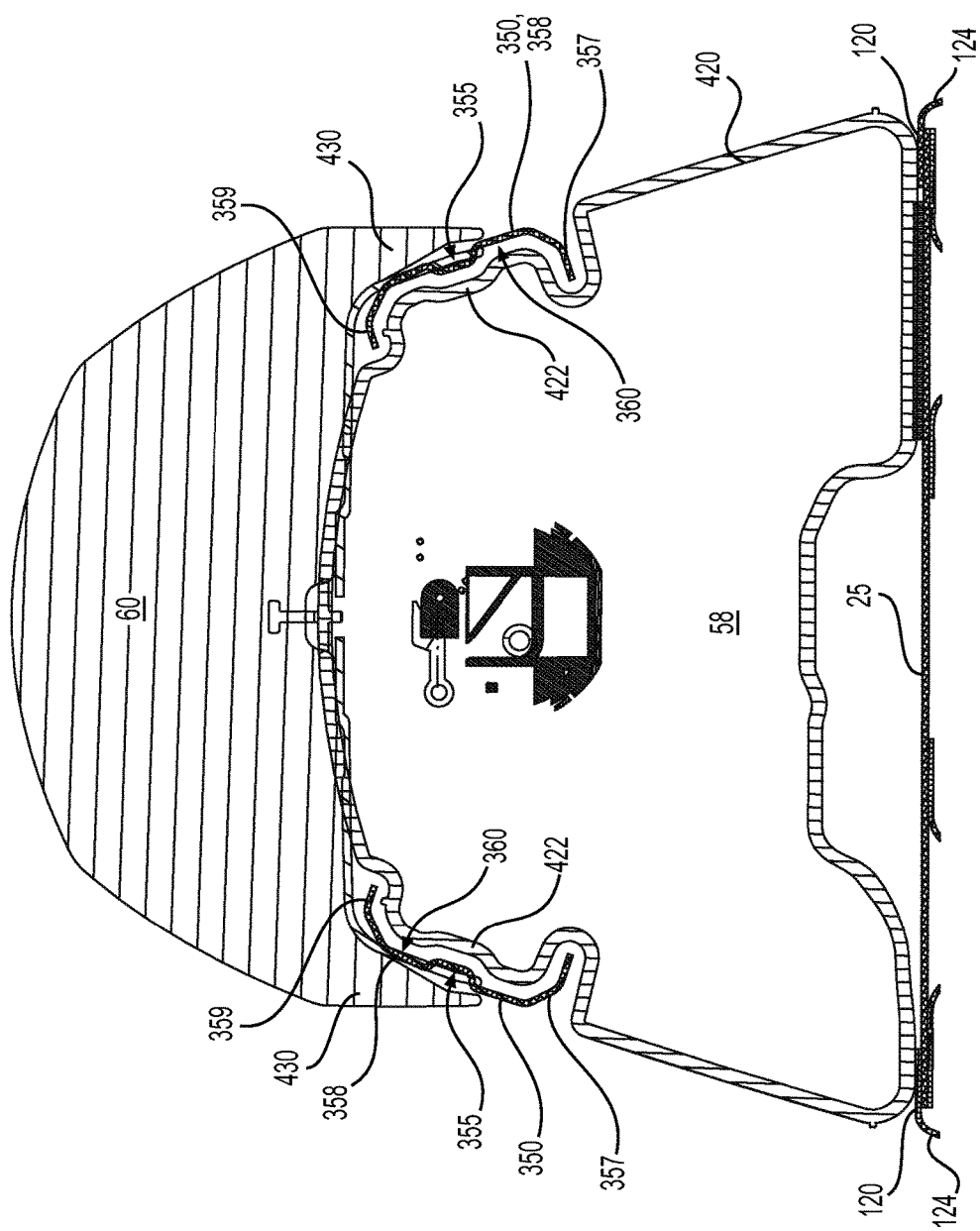
FIG. 16B is a cross-sectional view taken along the line 16B-16B of FIG. 14.

With reference to FIGS. 15 to 16A, a fastener 404 is inserted through the through-hole 402 into the fuel tank 52 to fasten the fuel tank 52 to the leg 350. The fastener 404 is in the form of a bolt having a bolt head 406 connected to a threaded shank 408 extending laterally inwardly through the hole 402 into the fuel tank 52. On the side opposite the threaded shank 408, the bolt head 406 has a projection 410 extending laterally outwardly from a laterally outer surface (the surface opposite the threaded shank 408) of the bolt head 406 to a spherical outer end 412.

With reference to FIGS. 14 to 16B, the fuel tank 52 has a body 420 having a left side portion 422 and a right side portion 422. The left side portion 422 is complementary to the channel 360 of the left leg 350 and received therein. The right side portion 421 is complementary to the channel 360 of the right leg 350 and received therein. The channel 360 of each leg 350 encloses the corresponding side portion 422 of the fuel tank body 420. The fuel tank body 422 has recessed portions that receive the front and rear walls 357, 359 extend laterally inwardly away from the side wall 358. In the illustrated implementation, the longitudinal walls 357, 358, 359 of the leg 350 are spaced from the outer surface of the corresponding side portion 422 (see FIGS. 16A and 16B) except in the wider recess portion 400 (see FIG. 16A). It is contemplated that the portions of the leg 350 other than in the wider recess portion 400 could be in contact with the outer surface of the side portion 422 of the fuel tank body 420. A metal insert 424 is molded into the left side portion 422 aligned with the wider recess portion 400. The insert 424 has an internally threaded elongated opening 426 which engages the threaded shank 408 of the fastener 404 to thereby fasten the fuel tank 52 to the left leg 350. The right side portion 422 similarly has a metal insert 424 with an internally threaded opening 426 engaging a right fastener 404 to fasten the right side of the fuel tank 52 to the right leg 350.

The seat 60 has a left side portion 430 disposed on the laterally outwardly facing surface of the side wall 358 such that the leg 350 is disposed between the left side portion 430 of the seat 60 and the left side portion 422 of the fuel tank body 420. The spherical outer end 412 of the projection 410 is received in a complementary slot 432 formed in a surface of the left side portion 430 facing laterally inwardly towards the leg 350 and the spherical outer end 412. The slot 432 engages the spherical outer end 412 of the fastener 404 to fasten the seat 60 to the left leg 350. The right fastener 404 also has a spherical outer end 412 which is similarly engaged by a slot 432 formed in a laterally inwardly facing surface of the right side portion 430 of the seat 60 to fasten the seat 60 to the right leg 350.

In all implementations of the leg 150, 150', 350 discussed above, the entire left leg 150, 150', 350 including the upper end 152, 352 connected to the steering bracket 148 and the lower end 154, 354 connected to the tunnel 18, is formed as a single integral structure. The left leg 150, 150', 350 is formed from a single piece of sheet metal structure that is bent to create the structure described above. The various apertures 156, 166, 168, 161 and recesses 155, 180, 190 are created by punching, stamping, or drilling, which can be done either before or after bending the sheet metal.

Forming the entire leg 150, 150', 350 out of a single piece of sheet metal allows the upper end 152, 352 and the lower end 154, 354 of the leg 150, 150', 350 to be connected to other vehicle portions (steering bracket 148 and tunnel 18 respectively) directly without the need for using separate attachment brackets as in the case of tubular braces such as the front support braces 108. With tubular braces, casted end portions are welded to the respective upper and lower ends of the tubes to allow their respective attachment to the steering bracket 148 and to the tunnel 18. Connecting the leg 150, 150', 350 directly to the other snowmobile portions without using additional brackets helps to reduce the overall weight of the snowmobile 10, and also to reduce complexity and cost in the fabrication and assembly thereof.

As mentioned above, the side wall 158, 358 below the upper end 152, 352 is flat and constructed without any bends in it. This flat, planar structure of the side wall 158 helps to reduce the risks of developing cracks or breaks at the location of the bend, especially in legs made of materials such as aluminum which have less fatigue strength than steel.

In addition, having the front wall 157, 357 and rear wall 159, 359 being angled with respect to the side wall 158, 358 and extending from the side wall 158, 358 along the entire length thereof below the upper end 152, 352 helps to increase the inertial strength and rigidity of the legs 150, 150', 350. The legs 150, 150', 350 described above, having front 157, 357, side 158, 358 and rear walls 159, 359 made of bent sheet metal, provide greater strength and resistance to forces of compression and torsion than an unbent sheet metal structure.

The footrests 64 will now be described in further detail with reference to FIGS. 2B, 2C, and 8 to 12.

With reference to FIGS. 2B, 2C and 8 to 12, the left footrest 64 is similar to a mirror image of the right footrest 64, and as such only the left footrest 64 will be described herein in detail. It is contemplated that the left and right footrests 64 could not be mirror images of each other.

Figure 8:
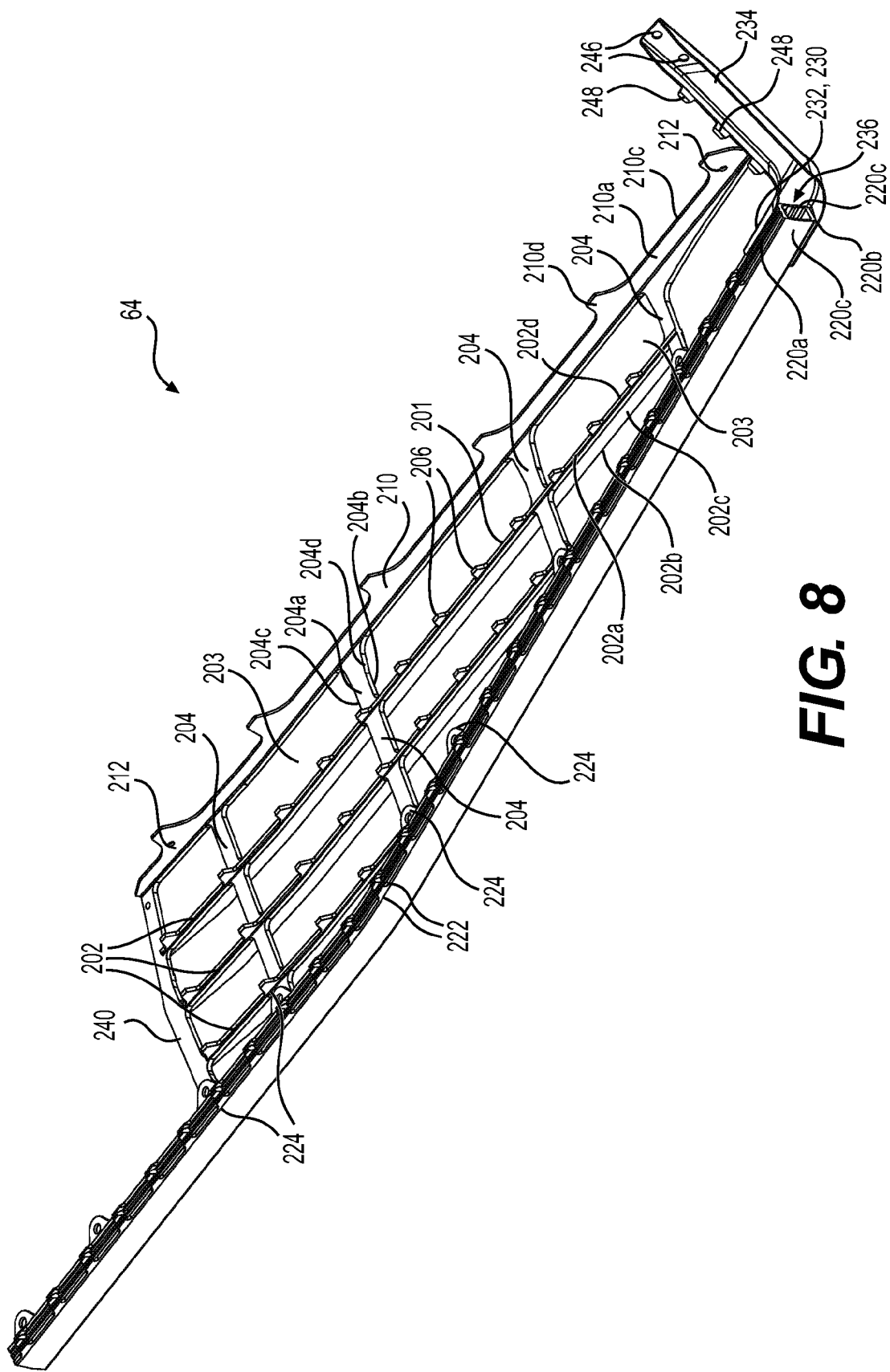
FIG. 8 is a perspective view, taken from a rear, left side, of a left footrest of the snowmobile of FIGS. 2A to 2D.
Figure 9:
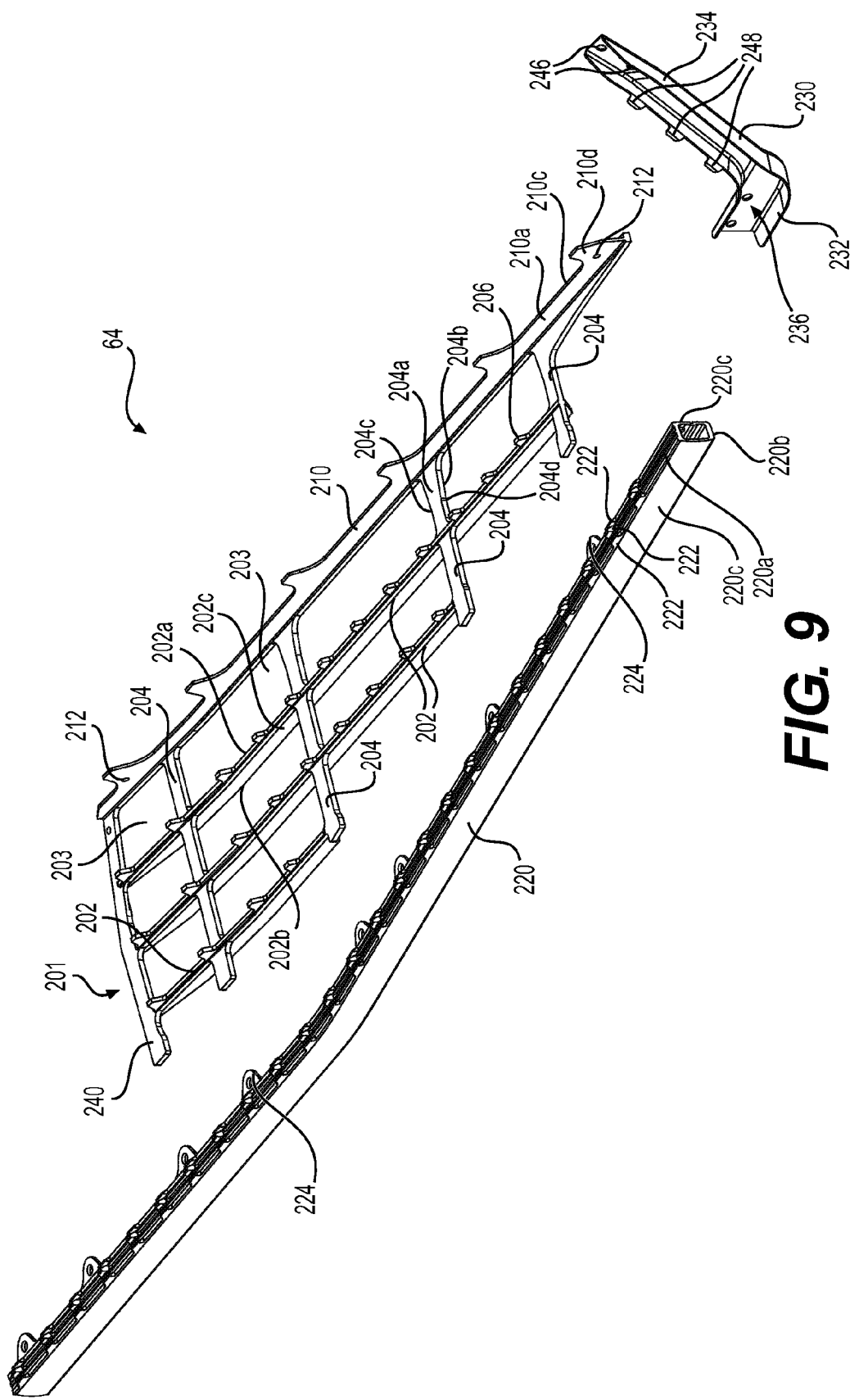
FIG. 9 is an exploded perspective view, taken from a rear, left side, of the left footrest of FIG. 8.
Figure 10:
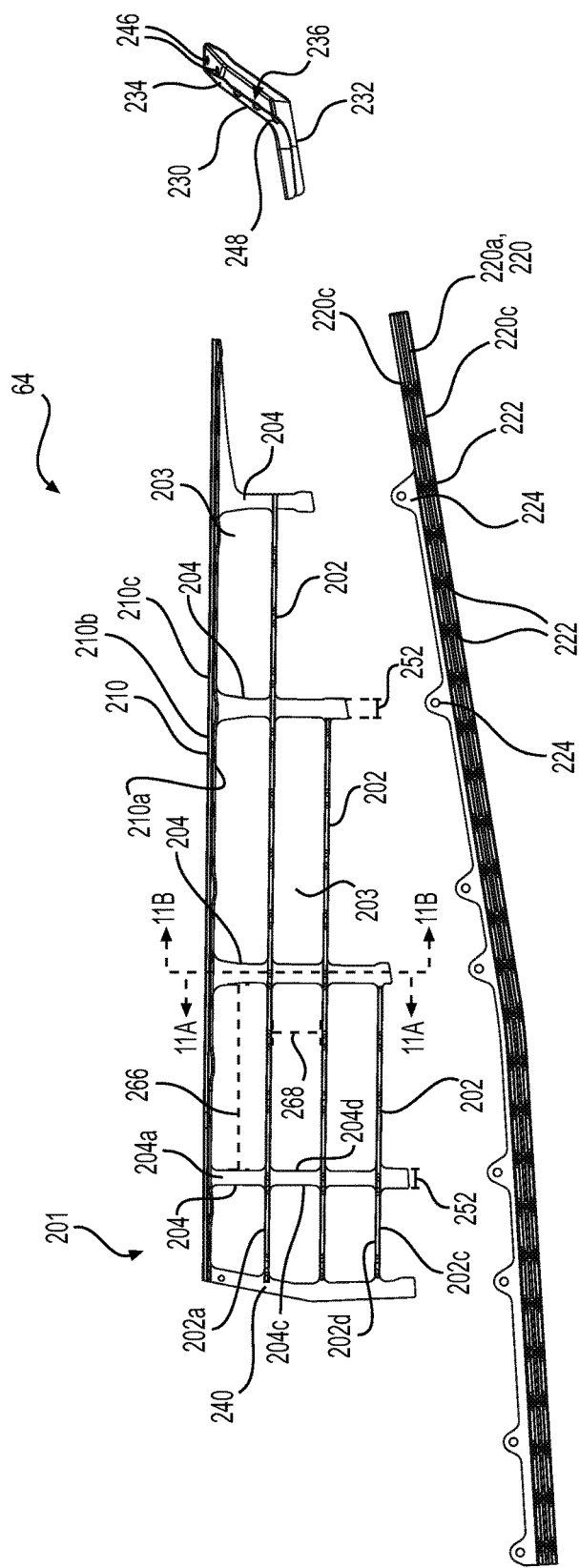
FIG. 10 is an exploded top plan view of the left footrest of FIG. 8.

With reference to FIGS. 8 to 10, the left footrest 64 includes a grid structure 201 formed of interconnected ribs 202, 204 defining large holes 203 therebetween. The ribs 202, 204 include longitudinal ribs 202 and lateral ribs 204. The longitudinal ribs 202 extend in a longitudinal direction and the lateral ribs 204 extend in a lateral direction generally perpendicular to the longitudinal ribs 204. It is contemplated that the ribs 202 could extend in a direction other than longitudinal, the ribs 204 could extend in a direction other than lateral (as in the implementation of the footrest 364 shown in FIGS. 14, 15 and 21 to 24), and that the ribs 202 could not extend in a direction perpendicular to the ribs 204. Consecutive longitudinal ribs 202 are connected to each other by lateral ribs 204 extending therebetween in a lateral direction. When the snowmobile 10 is traveling on soft snow and the footrests 64 begin to contact the snow, the large holes 203 help to reduce jacking by allowing snow to pass upwardly therethrough. In addition, the large holes 203 are helpful for clearing snow off the footrests 64 by allowing the snow to fall therethrough. This grid structure 201 of the footrest 64 with interconnected longitudinal and lateral ribs 202, 204 separated by large holes 203 reduces the weight of the snowmobile 10 without compromising the rigidity and strength of the footrest 64.

With reference to FIGS. 8 to 10, the left footrest 64 has three longitudinal ribs 202, including a left rib 202, a middle rib 202 and a right rib 202, each extending in the longitudinal direction. It is contemplated that there could be more or less than three longitudinal ribs 202. In the illustrated implementation of the footrest 64, the longitudinal ribs 202 are also equally spaced from one another in the lateral direction. It is also contemplated that the longitudinal ribs 202 could not be equally spaced from one another in the lateral direction. The front edges of all three longitudinal ribs 202 are connected together by a forwardmost lateral rib 240. The longitudinal ribs 202 extend rearward from the forwardmost lateral rib 240. The right longitudinal rib 202 extends farther rearward than the middle longitudinal rib 202, which in turn extends farther rearward than the left longitudinal rib 202. The left footrest 64 is thus tapered towards the rear. It is contemplated that the longitudinal ribs 202 could be configured differently than as shown herein.

As best seen in FIGS. 2C and 8 to 10, the lateral ribs 204 are also disposed parallel to one another when viewed from above. The lateral ribs 204 extend generally perpendicular to the longitudinal ribs 202 and normal to the longitudinal centerplane 13. As mentioned above, it is contemplated that the lateral ribs 204 could extend at an angle other than perpendicular with respect to the longitudinal ribs 202 and/or the longitudinal centerplane 13.

With reference to FIGS. 8 to 11B, each lateral rib 204 has a planar upper surface 204a, a planar lower surface 204b, a front surface 204c and a rear surface 204d. It is contemplated that the surfaces 204a, 204b could not be planar. A lateral rib height 250 (FIGS. 11A and 11B) is defined between the upper and lower lateral rib surfaces 204a, 204b. A lateral rib thickness 252 (FIG. 10) is defined between the front and rear lateral rib surfaces 204c, 204d.

With reference to FIGS. 8 to 11B, each longitudinal rib 202 has an upper surface 202a, a lower surface 202b, a left surface 202c and a right surface 202d. A longitudinal rib thickness 260 (FIG. 11A) is defined between the left and right longitudinal rib surfaces 204c, 204d. A longitudinal rib height 262 (FIGS. 11A and 11B) is defined between the upper and lower longitudinal rib surfaces 202a, 202b. The upper longitudinal rib surface 202a is disposed vertically higher than the upper lateral rib surface 204a. The lower longitudinal rib surface 202b is disposed vertically lower than the lower lateral rib surface 204b, by a vertical distance 264. The longitudinal rib thickness 260 is smaller than the longitudinal rib height 262. The longitudinal rib thickness 260 is also smaller than the height 264 of the portion of the longitudinal rib 202 disposed lower than the lower lateral rib surface 204b. The portion of the longitudinal rib 202 disposed lower than the lower lateral rib surface 204b thus acts like a blade that helps slice through the snow when the footrest 64 makes contact with the snow surface.

With reference to FIG. 10, each hole 203 has a length 266 measured between two consecutive lateral ribs 204 in a direction parallel to the longitudinal ribs 202. Each hole 203 has also a width 268 measured between two consecutive longitudinal ribs 202 in a direction perpendicular to the longitudinal ribs 202. As can be seen, all of the holes 203 in the illustrated implementation have the same width 268 but different lengths 266.

With reference to FIGS. 8 to 11B, the upper longitudinal rib surface 202a has several teeth 206 projecting upwardly therefrom. The teeth 206 provide traction to the riders' foot disposed on the footrest 64. Each tooth 206 extends above the upper longitudinal rib surface 202a by a height 272 (FIG. 11A). The height 272 of the teeth 206 is less than the extension 264 of the longitudinal rib 202 below the lower surface 204b of the lateral rib 204. It is contemplated that the number and configuration of the ribs 202, 204 could be different than that described herein.

With reference to FIGS. 8 to 12, the footrest 64 has an inner mounting flange 210 for connecting the footrest 64 to the left side wall 122 of the tunnel 18. The inner mounting flange 210 forms an inner edge of the footrest 64. The inner mounting flange 210 is in the form of a plate extending longitudinally and vertically with an inner surface 210b (FIGS. 11A and 11B) facing laterally inwardly and an outer surface 210a facing laterally outwardly. The upper edge 210c has several tabs 210d extending upwardly therefrom. Some of the tabs 210d have through-holes 212 defined therethrough. Bolts (not shown) are inserted through the through-holes 212 and through corresponding holes formed in the left side wall 122 of the tunnel 18 to connect the footrest 64 to the tunnel 18. It is contemplated that other types of fasteners such as rivets, or self-piercing rivets could also be used to fasten the footrest 64 to the tunnel 18. The front edge of the inner mounting flange 210 is connected to the forwardmost lateral rib 240. Several other lateral ribs 204 extends leftwardly (laterally outwardly) from the outer surface 210a of the inner mounting flange 210 to the right longitudinal rib 202. The inner mounting flange 210 extends farther rearward than the right longitudinal rib 202. The inner mounting flange 210 is formed integrally with the lateral ribs 204. It is contemplated that the inner mounting flange 210 could be connected to the ribs 202, 204 without being integrally formed therewith.

Figure 12:
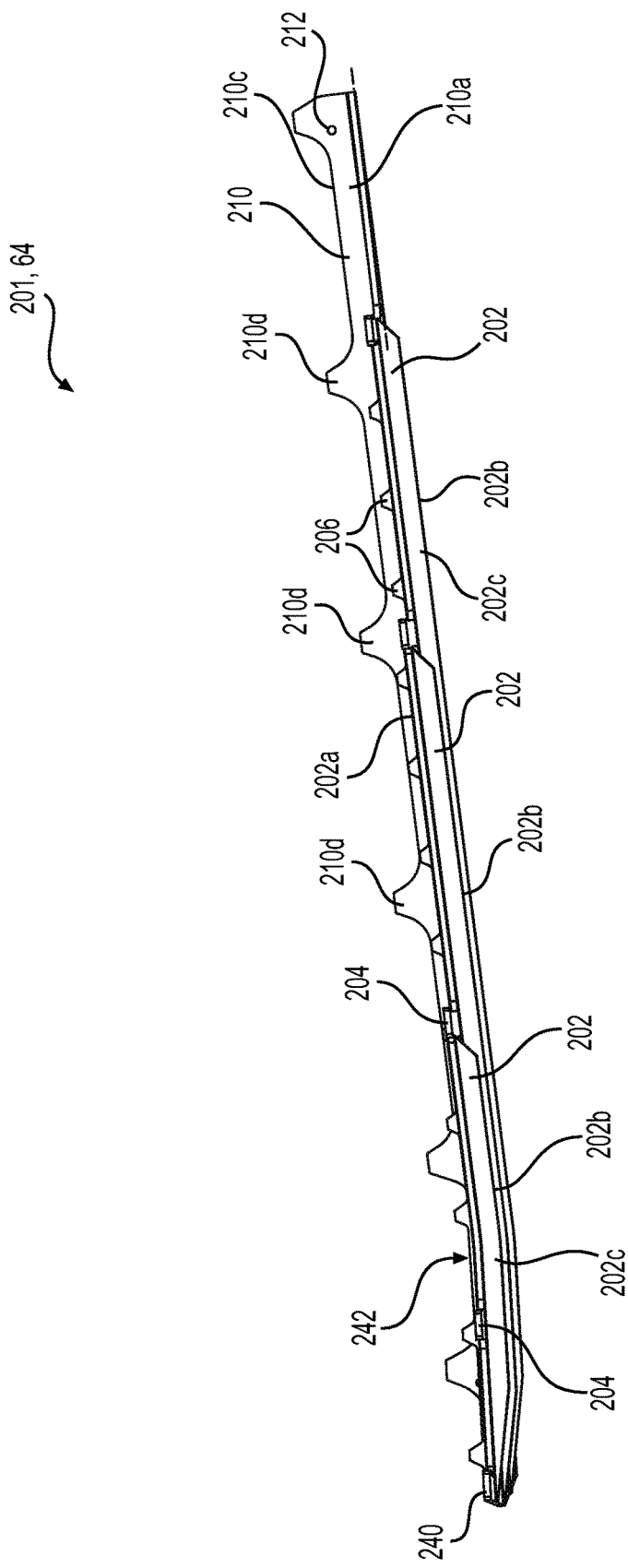
FIG. 12 is a left side elevation view of a portion of the left footrest of FIG. 8.

As best seen in FIG. 12, the left footrest 64 has a bend 242 formed just rearward of the second row of lateral ribs 204. The front portion of the left footrest 201 forward of the bend 242 is bent upwardly with respect to the portion rearward of the bend 242.

With reference to FIGS. 2B and 2C, the left footrest 64 includes a front tunnel extension 128 disposed forward of the grid structure 201. The front tunnel extension 128 extends laterally outwardly from the bottom edge of the left side wall 122. As mentioned above, the front tunnel extension 128 is formed integrally with the tunnel 18 and has a plurality of holes 129. The forwardmost lateral rib 204 is fastened to the rear end of the left tunnel extension 128 so as to form a continuous support for a rider's left foot. The toehold 66 extends upwardly from the front edge of the front tunnel extension 128. The footrest support 62 is also connected to the left (laterally outer edge) of the front tunnel extension 128.

With reference to FIGS. 2B and 2C, the left footrest 64 is also connected to the tunnel 18 by an outer mounting bracket 220 connected to the left side (laterally outer) edge of the left footrest 64 and a rear mounting bracket 230 connected to a rear edge of the outer mounting bracket 220.

As can be seen in FIGS. 8 to 10, the outer mounting bracket 220 extends longitudinally and slightly laterally outwardly from its rear end to its front end. The outer mounting bracket 220 is in the form of a hollow tubular structure formed by extrusion. As best seen in FIGS. 8 and 9, the outer mounting bracket 220 of the illustrated implementation has a rectangular cross-section with a generally horizontal upper surface 220a and a generally horizontal lower surface 220b connected together by a pair of vertical surfaces 220c. The upper surface 220a of the outer mounting bracket 220 is ribbed and has teeth 222 projecting upwardly therefrom to provide traction to a rider's left foot. In the illustrated implementation, the outer mounting bracket 220 has three longitudinal rows of teeth 222 formed on its upper surface 220a. It is however contemplated that there could be more or less than three rows of teeth 222. A number of tabs 224 extending laterally inwardly from the vertically extending surface 220c facing laterally inwardly toward the tunnel 18. The tabs 224 have through-holes defined therethrough. The tabs 224 are connected to the lateral ribs 204 by bolts inserted through the holes of the outer mounting flange tabs 224 and through corresponding holes defined in the left edges of the later ribs 204 as best seen in FIG. 2C.

With reference to FIGS. 8 to 10, a front portion of the outer mounting bracket 220 extends forward of the forwardmost lateral rib 240. The front portion of the outer mounting bracket 220 extends on a left side (laterally outer side) of the left front tunnel extension 128 and is fastened thereto by the tabs 224 to further secure the front portion of the footrest 64 to the tunnel 18.

With reference to FIGS. 8 to 10, the rear mounting bracket 230 has a front portion 232 that extends generally longitudinally, and a rear portion 234 that extends upwardly and rearwardly from the front portion 232. The rear mounting bracket 230 forms a C-shaped channel 236 that is open in a direction facing away from the tunnel 18. The channel 236 extends in the front and rear portions 232, 234 of the rear mounting bracket 230. The rear end of the outer mounting bracket 220 is received in the channel 236 in the front portion 232 such that the inner vertical surface 220c of the outer mounting bracket 220 abuts against the inner channel wall of the rear mounting bracket 230. The outer mounting bracket 220 is fastened to the rear mounting bracket 230 by rivets, or other fasteners, inserted through aligned through-holes 244 (FIG. 9) of the inner vertical surface 220c of the outer mounting bracket 220 and the inner channel wall of the rear mounting bracket 230. The inner channel wall of the rear portion 234 of the rear mounting bracket 230 abuts the left side wall 122 of the tunnel 18 and is fastened thereto by rivets, or other fasteners, inserted through aligned holes 246 (FIGS. 8 and 9) of the rear portion 234 and the left side tunnel wall 122. The rear end of the outer mounting bracket 220 is thus secured to the tunnel 18 by the rear mounting bracket 230. The rear portion 234 of the rear mounting bracket 230 also has three teeth 248 extending laterally outwardly from the edge of the laterally extending front surface to provide traction to a riders foot. It is contemplated that there could be more or less than three teeth 248.

As can be seen in FIGS. 2A to 2C, the left footrest 64 is thus secured to the tunnel 18 by its left (laterally outer) edge, its rear edge and its right (laterally inner) edge.

With reference to FIGS. 8 to 10, the hollow tubular structure of the outer mounting bracket 220 and the structure of the rear mounting bracket 230 having the open channel 236 help to reduce the weight of the vehicle 10. It is contemplated that the mounting brackets 220, 230 could be configured differently than as shown herein, and connected together differently than as shown herein. It is also contemplated that the rear mounting bracket 230 could be formed integrally with the outer mounting bracket 220.

The various dimensions of the grid structure 201 in the footrest 64 are selected as described below to reduce jacking and increase trenching while still providing appropriate support to a rider's foot disposed on the footrest 64 and without causing any significant increase in the weight of the snowmobile 10.

Figure 11A:
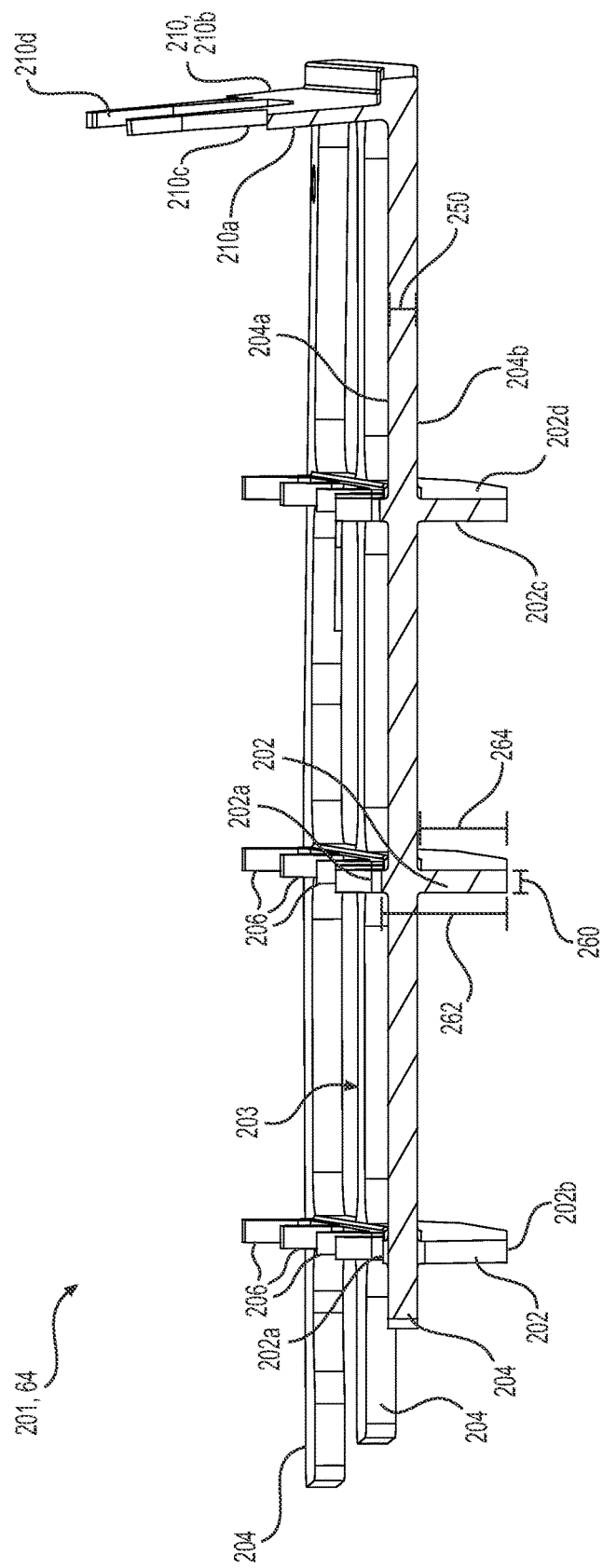
FIG. 11A is a cross-sectional view, taken along the line 11A-11A of FIG. 10.
Figure 11B:
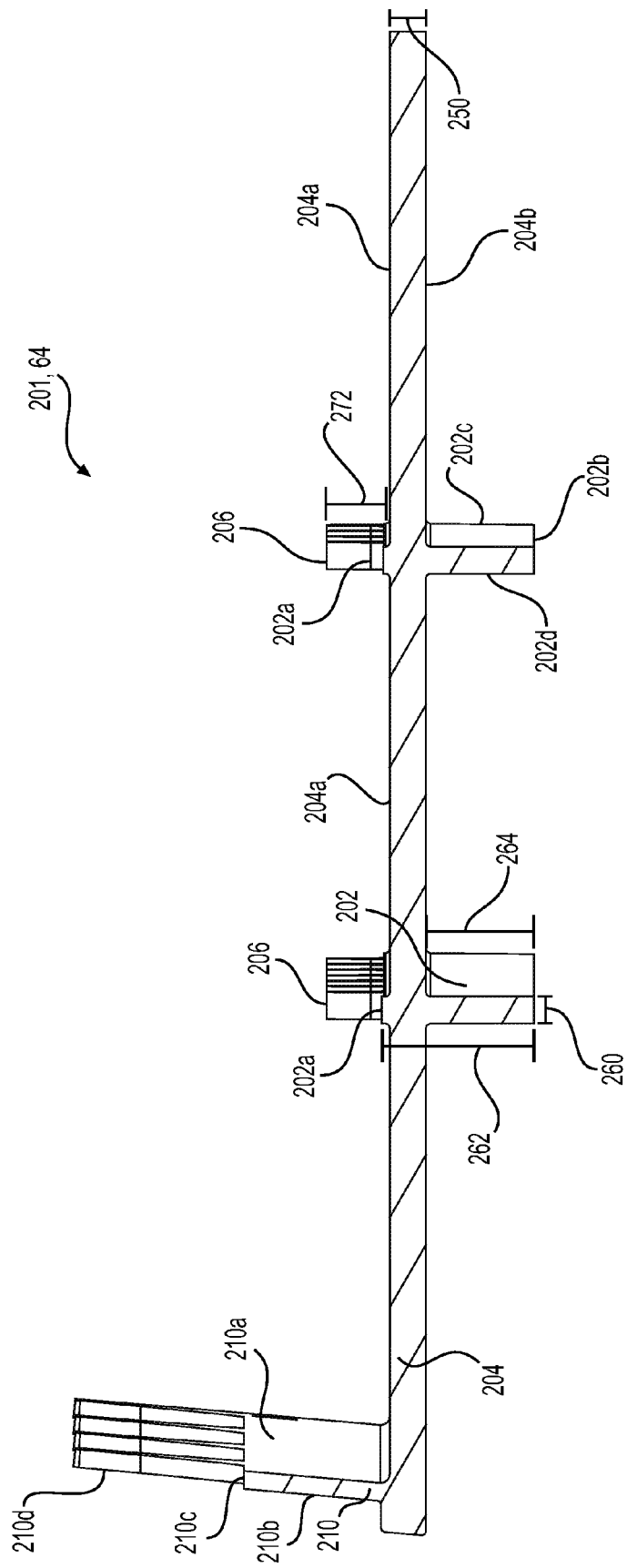
FIG. 11B is a cross-sectional view, taken along the line 11B-11B of FIG. 10.

With reference to FIGS. 11A and 11B, in the illustrated implementation, a ratio R1 of the extension 264 of the longitudinal rib 202 below the lateral rib surface 204b to the longitudinal rib thickness 260 is selected to be greater than 1.5 and less than 5.5. In the illustrated implementation of the footrest 64 in FIGS. 8 to 12, the ratio R1 is approximately 3.3.

A ratio R2 of a hole width 268 measured in millimeters to the value of the ratio R1 is selected to be greater than 5.0 and less than 15. In the illustrated implementation, the ratio R2 is approximately 10.

A ratio R3 of the hole width 268 to the extension 264 of the longitudinal rib 202 below the lateral rib surface 204b is selected to be greater than 1.0 and less than 6.0. In the illustrated implementation, the ratio R2 is approximately 3.0.

It has been noted that trenching can be increased and jacking can be reduced while still providing appropriate support to a riders foot disposed on the footrest 64 and without causing any significant increase in the weight of the snowmobile 10 if the footrest 64 is configured such that the ratio R1 is between 1.5 and 5.5, the ratio R2 is between 5.0 and 15.0, and the ratio R3 is between 1.0 and 6.0.

The footrest 64 is formed by a process that includes an initial extrusion step. The extrusion step forms a horizontally extending plate (not shown) with parallel ribs 202 and the mounting flange 210. The ribs 202 extend above and below the horizontal plate while the mounting flange 210 extends upward from an edge of the horizontal plate. The direction of extrusion defines the direction of the ribs 202 and the mounting plate. In the implementation of the footrest 64 shown herein, the ribs 202 are aligned with the longitudinal direction of the vehicle 10 (parallel to the longitudinal centerplane 13) when the footrest 64 is connected to the vehicle 10. It is however contemplated that the ribs 202 could extend at an angle to the longitudinal centerplane 13. For convenience, the process of forming the footrest 64 is described herein referring to the direction defined by the ribs 202 as the longitudinal direction, but the present technology is not to be limited by the adoption of this terminology.

The lateral ribs 204, and the holes 203 are then created by punching holes through the horizontal extruded plate between the parallel ribs 202. It is contemplated that the lateral ribs 204 and holes 203 could be created by other methods. The punching step for forming the lateral ribs 204 and the holes 203 is performed by displacing the punch in a vertical direction with respect to the horizontal extrusion plate.

The teeth 206 on the upper surface of the longitudinal ribs 202 and the upward extensions 210d of the inner mounting flange 210 are created by a separate punching step in which the punch is displaced laterally with respect to the longitudinal ribs 202 and the extrusion direction. The upward extensions 210d of the mounting flange 210 could be created by a separate punching step, in which the punch is displaced laterally with respect to the longitudinal ribs 202 and the extrusion direction. It is also contemplated that the teeth 206 and the upward extensions 210d could be created by a different process, such as machining. The upward bend 242 best seen in FIG. 12, is created after the extrusion and the punching processes.

As mentioned above, the outer mounting bracket 220 is formed by extrusion. The rear mounting bracket 230 is formed by casting and/or stamping.

It is contemplated that the footrests 64 could be formed of any suitable materials and by processes other than as described herein.

With reference to FIGS. 14, 15 and 21 to 24, another implementation of footrests 64 will now be described. The footrests 364 of FIGS. 14, 15 and 21 to 24 have many features similar to the corresponding features of footrests 64 of FIGS. 1 to 2D and 8 to 12. As such, features of the footrest 364 similar to the corresponding features of footrests 64 have been labeled with the same reference numbers and will not be described again herein. The footrest 364 will only be described herein in detail with respect to differences from the footrest 64. The left footrest 364 is similar to a mirror image of the right footrest 364 and as such corresponding features of the left and right footrests 364 have been labeled with the same reference numbers and only the left footrest 364 will be described herein.

The left footrest 364 has a grid structure 201 formed of interconnected ribs 202, 304 defining large holes 303 therebetween. The longitudinal ribs 202 extend in a longitudinal direction. The ribs 304 extend more in a lateral direction than a longitudinal direction, and are therefore referred to herein as lateral ribs 304. Consecutive longitudinal ribs 202 are connected to each other by lateral ribs 204 extending therebetween. The lateral ribs 304 extend at a non-perpendicular angle to the longitudinal ribs 204. It is contemplated that the ribs 202 could extend in a direction other than longitudinal. The holes 303 defined by the ribs 202, 304 are therefore trapezoidal rather than rectangular in shape as in the footrests 64.

Figure 22:
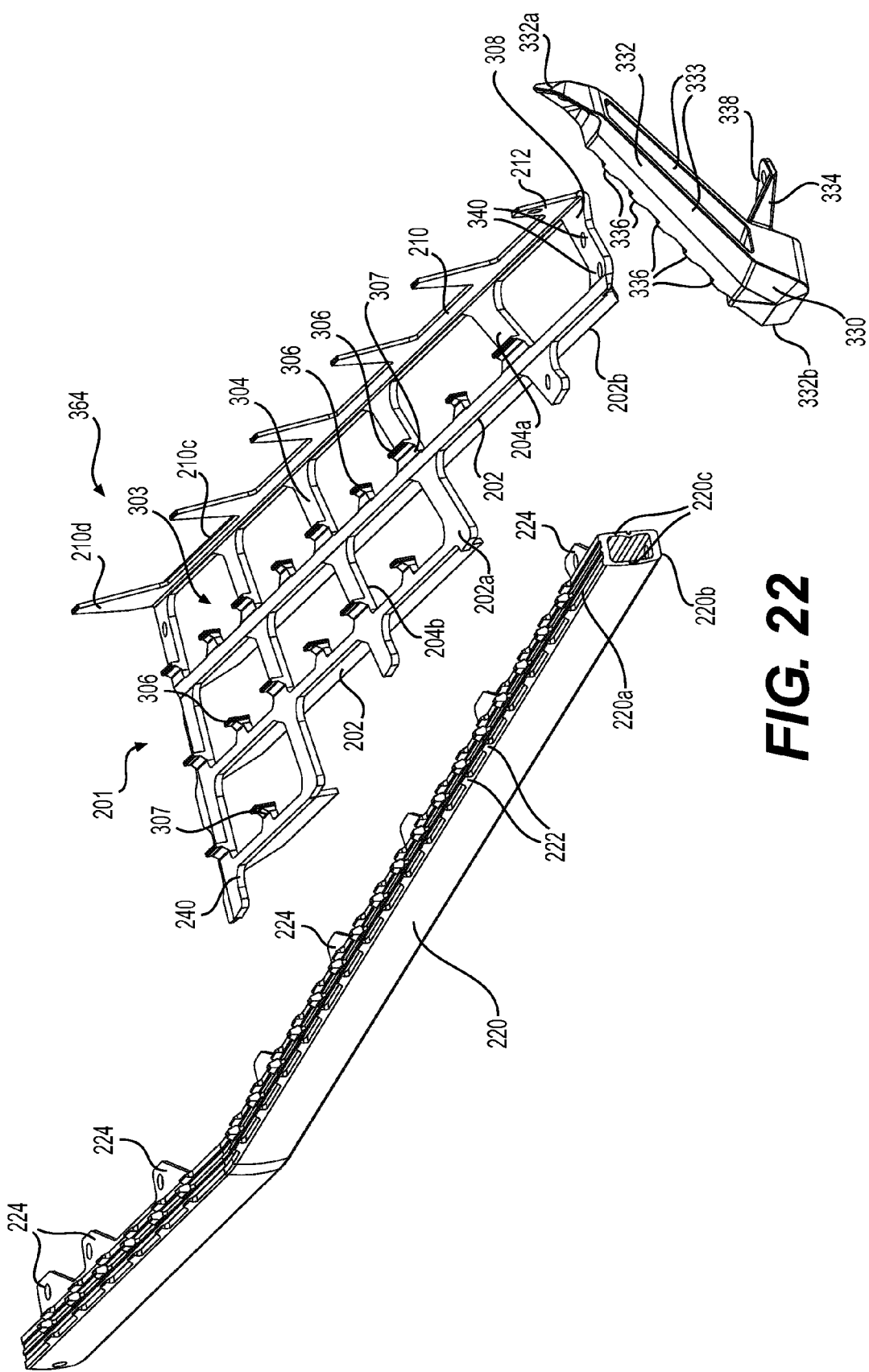
FIG. 22 is an exploded perspective view, taken from a rear, top and left side, of the left footrest of FIG. 21.
Figure 23:
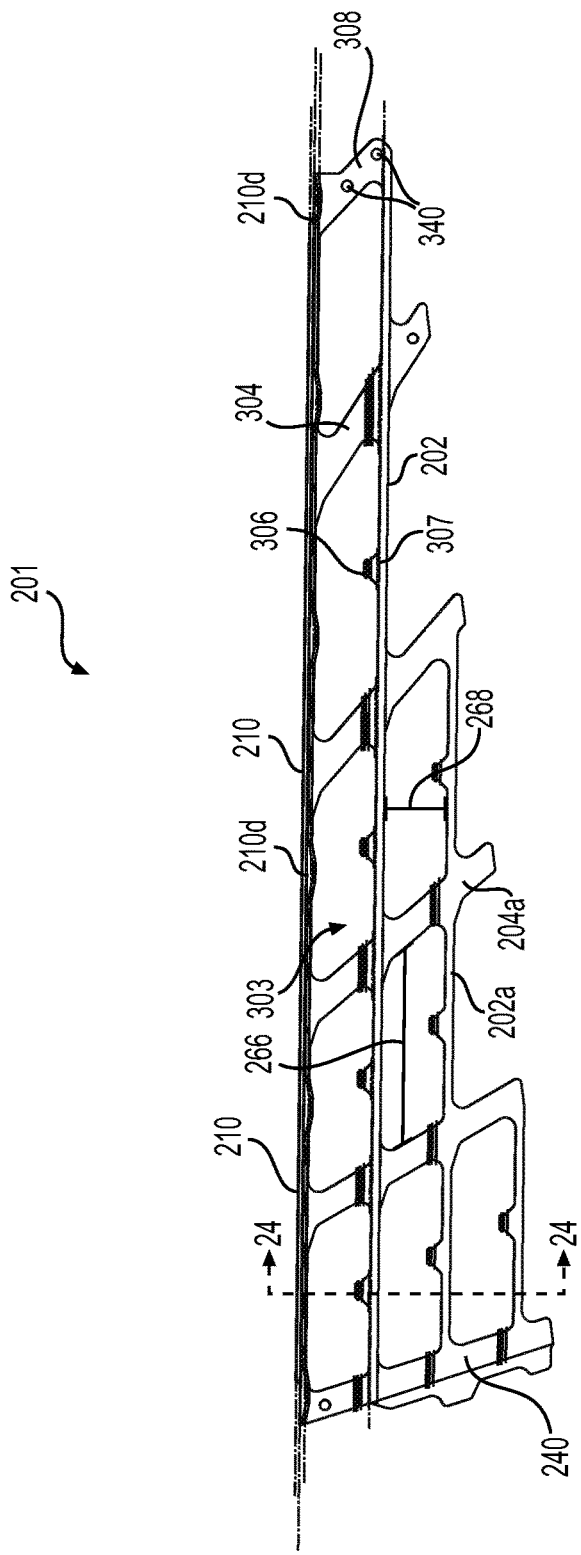
FIG. 23 is a top plan view of a portion of the left footrest of FIG. 22.
Figure 24:
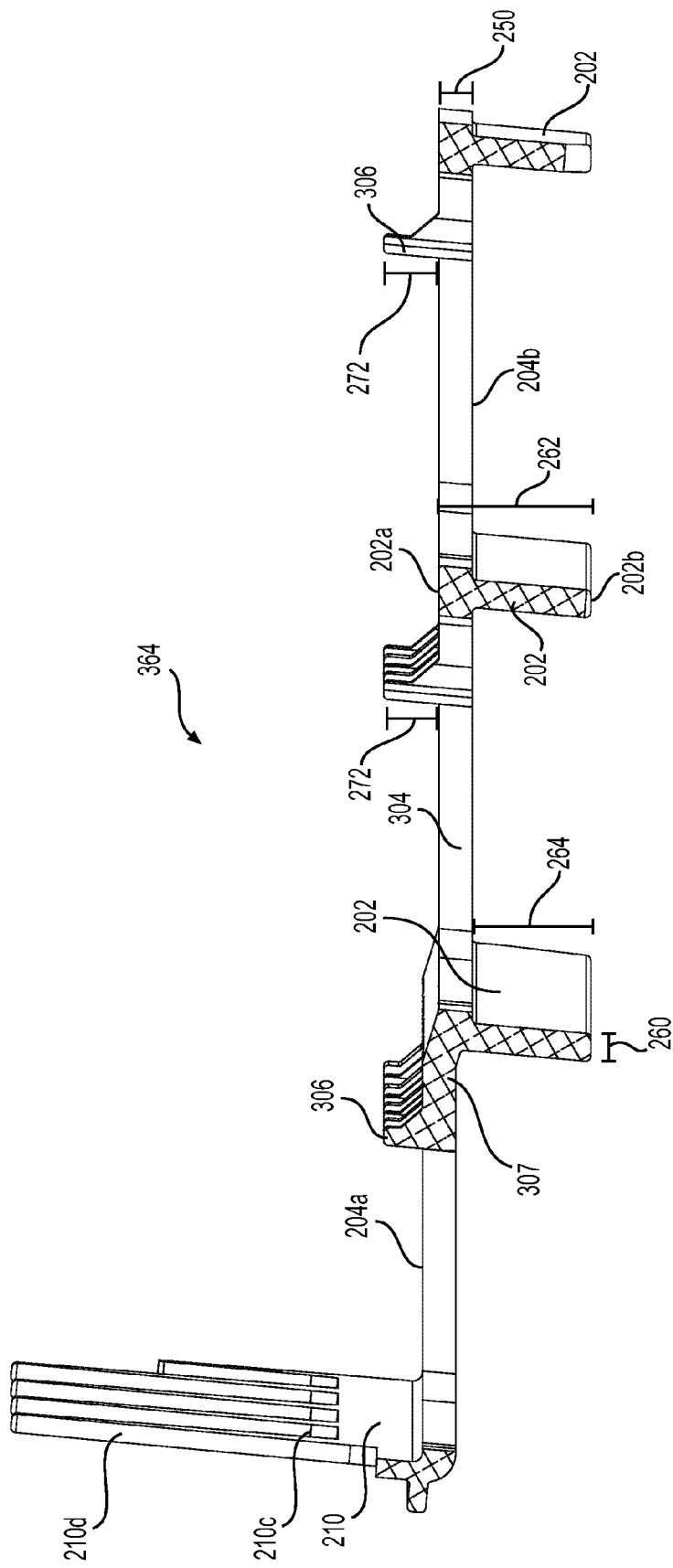
FIG. 24 is a cross-sectional view taken along the line 24-24 of FIG. 23.

With reference to FIGS. 22 to 24, the footrest 364 includes several teeth 306 projecting upwardly from the grid structure 201 and extending vertically higher than the upper surface 204a of the lateral ribs 304. The teeth 306 provide traction to the riders' foot disposed on the footrest 364. Each tooth 306 is laterally offset from a longitudinal rib 202 and connected thereto by a bridge portion 307 that extends laterally inwardly from the longitudinal rib 202. Some of the teeth 306 are disposed between consecutive lateral ribs 304 while other teeth 306 extend upward from the upper surface 204a of a lateral ribs 304. The teeth 306 extend above the upper longitudinal rib surface 202a by a height 272 (FIG. 11A). The height 272 of the teeth 306 above the upper lateral rib surface 202a is smaller than the extension 264 of the longitudinal rib 202 below the lower lateral rib surface 202b. This configuration of the teeth 306 being offset from the longitudinal ribs 202 allows the teeth 306 to be formed in the same extrusion step as the longitudinal ribs 202 thereby eliminating the extra punching step required for forming the teeth 206 of the footrest 64. This configuration of the teeth 306 therefore allows for a simplification in fabrication of the footrest 364 while still providing traction to a rider's foot disposed on the footrest 364.

The footrest 364 of FIGS. 21 to 24 is configured such that the values of the ratios R1, R2 and R3 (discussed above with respect to the footrest 64 of FIGS. 8 to 12) are similar for the footrest 364 as for the footrest 64.

With reference to FIGS. 21 to 24, the footrest 364 has a rear mounting bracket 330. The rear mounting bracket 330 has an upper portion 332 and a lower portion 334. An upper end 332a of the upper portion 332 is connected to the left side wall 122 of the tunnel 18 by bolts inserted through aligned through-holes of the rear mounting bracket 330 and the left tunnel wall 122. The upper portion 332 extends downwardly and laterally outwardly from the upper end 332a thereof to a lower end 332b thereof. The lower end 332b of the rear mounting bracket upper portion 332 forms a channel (not shown) that is open towards the front of the snowmobile 10. The rear end of the outer mounting bracket 220 is received in the channel of the lower end 332b and fastened thereto. The rear end of the outer mounting bracket 220 is thus secured to the tunnel 18 by the rear mounting bracket 330. The upper portion 332 two longitudinally and vertically extending walls 333 extending between the upper and lower ends, 332a and 332b. The front edge of the laterally outer wall 333 has six teeth 336 extending forwardly therefrom to provide traction to a riders foot. It is contemplated that there could be more or less than six teeth 336. It is also contemplated that the teeth 336 could be omitted. The lower portion 334 is formed as a flange extending horizontally and laterally inwardly from the lower end 332b. The laterally inner end 338 of the flange 334 is connected to the horizontal plate 144 of the rear suspension attachment bracket 142 by a bolt inserted through aligned through holes of the flange 334 and the horizontal plate 144. The rearwardmost lateral rib 308 of the footrest 364 extending laterally outwardly and rearwardly from the rear end of the mounting flange 210 has a pair of through-holes 340. The rearwardmost lateral rib 308 is also connected to the horizontal plate 144 by bolts inserted through the aligned through-holes of the rearwardmost lateral rib 308 and the horizontal plate 144. In the illustrated implementation, the inner end 338 of the flange 334 is also connected to the rearwardmost lateral rib 308.

Modifications and improvements to the above-described implementations of the present may become apparent to those skilled in the art. The foregoing description is intended to be exemplary rather than limiting. The scope of the present is therefore intended to be limited solely by the scope of the appended claims.

What is claimed is:

1. A snowmobile comprising:
a frame including a longitudinally extending tunnel;
at least one ski operatively connected to the frame;
an endless drive track operatively connected to the frame;
a motor supported by the frame and operatively connected to the drive track for propelling the snowmobile;
a straddle seat disposed above the tunnel and adapted to accommodate a rider;
a left footrest connected to the tunnel and disposed on a left side thereof;
a right footrest connected to the tunnel and disposed on a right side thereof,
each of the left and right footrests comprising a plurality of interconnected ribs extending generally horizontally, the plurality of ribs comprising:
at least one first rib extending in a first direction, each of the at least one first rib comprising an upper first rib surface and a lower first rib surface defining a first rib height therebetween, each of the at least one first rib comprising a pair of vertical first rib surfaces extending generally in a vertical direction between the upper and lower first rib surfaces, the pair of vertical first rib surfaces defining a first rib thickness therebetween, the first rib height being greater than the first rib thickness; and
at least one second rib connected to the at least one first rib, each of the at least one second rib extending in a second direction, the second direction being at an angle with respect to the first direction; and
at least one hole, the at least one first rib and the at least one second rib defining the at least one hole therebetween.

2. The snowmobile of claim 1, wherein for each portion of any one of the at least one first rib having any one of the at least one second rib connected thereto,
the lower first rib surface of that portion is disposed vertically lower than the one of the at least one second rib connected thereto.

3. The snowmobile of claim 2, wherein for each portion of any one of the at least one first rib having any one of the at least one second rib connected thereto,
the lower first rib surface is disposed vertically lower than the one of the at least one second rib connected thereto by a distance greater than the first rib thickness.

4. The snowmobile of claim 3, wherein a ratio of the distance to the first rib thickness is greater than 1.5 and less than 5.5.

5. The snowmobile of claim 4, wherein:
the ratio is a first ratio;
each of the at least one hole has a hole width measured in a direction perpendicular to the first direction; and
a second ratio of the hole width measured in millimeters to the first ratio is greater than 5.0 and less than 15.0.

6. The snowmobile of claim 3, wherein:
each of the at least one hole has a hole width measured in a direction perpendicular to the first direction; and
a ratio of the hole width to the distance is greater than 1.0 and less than 6.0.

7. The snowmobile of claim 1, wherein the first direction is a longitudinal direction of the snowmobile.

8. The snowmobile of claim 7, wherein at a connection between any one of the at least one second rib and any one of the at least one first rib, the lower first rib surface of the one of the at least one first rib is disposed vertically lower than the one of the at least one second rib.

9. The snowmobiles of claim 8, wherein the lower first rib surface of the one of the at least one first rib is disposed vertically lower than the one of the at least one second rib by a distance greater than the first rib thickness.

10. The snowmobile of claim 7, wherein the second direction is a lateral direction of the snowmobile.

11. The snowmobile of claim 1, wherein each of the at least one second rib comprises:
an upper second rib surface and a lower second rib surface, the upper and lower second rib surfaces being spaced from each other in the vertical direction and defining a second rib height therebetween;
a front second rib surface and a rear second rib surface extending between the upper and lower second rib surfaces and defining a second rib thickness therebetween, the second rib thickness being greater than the second rib height.

12. The snowmobile of claim 11, wherein the second rib thickness is greater than the first rib thickness.

13. The snowmobile of claim 1, wherein a first distance between two consecutive ones of the at least one first rib is smaller than a second distance between two consecutive ones of the at least one second rib, the first distance being measured in a direction perpendicular to the first direction, the second distance being measured in a direction perpendicular to the second direction.

14. The snowmobile of claim 1, wherein the at least one first rib is integrally formed with the at least one second rib.

15. The snowmobile of claim 14, wherein the at least one first rib and the at least one second rib are formed at least in part by extrusion.

16. The snowmobile of claim 15, wherein the first direction is defined by a direction of extrusion.

17. The snowmobile of claim 1, wherein each of the left and right footrests further comprises a plurality of teeth, each tooth of the plurality of teeth projecting upwardly from at least one of:
at least one of the at least one first rib; and
at least one of the at least one second rib.

18. The snowmobile of claim 1, wherein:
the tunnel comprises a left side surface and a right side surface, the plurality of interconnected ribs of the left footrest being disposed leftwardly of the left side surface, the plurality of interconnected ribs of the right footrest being disposed rightwardly of the right side surface; and
each of the left and right footrests further comprises:
a front tunnel extension extending generally horizontally and laterally outwardly from the tunnel and being integrally formed therewith, the plurality of interconnected ribs being disposed rearward of the front tunnel extension;

a mounting bracket connected to a laterally outer edge of the plurality of ribs and removably connected to the front tunnel extension;

an inner mounting flange formed along a laterally inner edge of the corresponding plurality of interconnected ribs and to the corresponding one of the left and right side surfaces of the tunnel; and an outer mounting bracket connected to a laterally outer edge of the corresponding plurality of interconnected ribs and to a laterally outer edge of the corresponding front tunnel extension; and a rear mounting bracket connected to the outer mounting bracket and to the corresponding one of the left and right side surfaces of the tunnel.

19. The snowmobile of claim 1, wherein, when viewed from a top of the snowmobile, each of the left and right footrests tapers in a rearward direction.

20. A footrest adapted to be disposed on a side of a longitudinally extending tunnel of a snowmobile, the footrest comprising:

a plurality of interconnected ribs, the plurality of interconnected ribs comprising:

at least one first rib extending in a first direction, each of the at least one first rib comprising an upper first rib surface and a lower first rib surface defining a first rib height therebetween, each first rib comprising a pair of vertical first rib surfaces extending generally in a vertical direction between the upper and lower first rib surfaces, the pair of vertical first rib surfaces defining a first rib thickness therebetween, the first rib height being greater than the first rib thickness;

at least one second rib connected to the at least one first rib, each of the at least one second rib extending in a second direction, the second direction being at an angle with respect to the first direction; and at least one hole, the at least one first rib and the at least one second rib defining the at least one hole therebetween.

21. A snowmobile comprising:

a frame including a longitudinally extending tunnel;

at least one ski operatively connected to the frame;

an endless drive track operatively connected to the frame;

a motor supported by the frame and operatively connected to the drive track for propelling the snowmobile;

a straddle seat disposed above the tunnel and adapted to accommodate a rider;

a left footrest connected to the tunnel and disposed on a left side thereof;

a right footrest connected to the tunnel and disposed on a right side thereof, each of the left and right footrests comprising a plurality of interconnected ribs extending generally horizontally, the plurality of ribs comprising:

at least one first rib extending in a first direction;

at least one second rib connected to the at least one first rib, the at least one second rib extending in a second direction, the second direction being at an angle with respect to the first direction;

at least one hole, the at least one first rib and the at least one second rib defining the at least one hole therebetween; and at least one tooth projecting upward from the footrest, the at least one tooth being offset from the at least one first rib in the second direction.

22. The snowmobile of claim 21, wherein each of the at least one tooth is connected to a corresponding one of the at least one first rib via a bridge.

23. The snowmobile of claim 21, wherein each of the at least one tooth projects upward from an upper surface of a corresponding one of the at least one second rib.

24. The snowmobile of claim 21, wherein:

each of the at least one first rib comprises an upper first rib surface and a lower first rib surface defining a first rib height therebetween, each of the at least one first rib comprises a pair of vertical first rib surfaces extending generally in a vertical direction between the upper and lower first rib surfaces, the pair of vertical first rib surfaces defining a first rib thickness therebetween, the first rib height being greater than the first rib thickness, each of the at least one second rib comprises an upper second rib surface and a lower second rib surface, the upper and lower second rib surfaces being spaced from each other in the vertical direction and defining a second rib height therebetween, each of the at least one second rib comprises a front second rib surface and a rear second rib surface extending between the upper and lower second rib surfaces and defining a second rib thickness therebetween, the second rib thickness being greater than the second rib height; and each of the at least one tooth extends above the at least one upper first rib surface by a distance smaller than the distance between the lower first rib surface and the lower second rib surface.

25. The snowmobile of claim 21, wherein for each of the left and right footrests:

the footrest is made at least in part by extrusion, the first direction being defined by a direction of extrusion, the at least one tooth being formed at least partially by extrusion.

26. The snowmobile of claim 21, wherein for each of the left and right footrests:

the at least one first rib is two first ribs being parallel to each other;

the at least one second rib is two second ribs being parallel to each other;

the two first ribs and the two second ribs define the at least one hole therebetween, the at least one hole having a hole width and a hole length; and at least a portion of the at least one tooth being disposed within the at least one hole.

* * * * *

UNITED STATES PATENT AND TRADEMARK OFFICE
CERTIFICATE OF CORRECTION

PATENT NO. : 9,738,301 B2
APPLICATION NO. : 14/788624
DATED : August 22, 2017
INVENTOR(S) : Sebastien Vezina et al.

Page 1 of 1

It is certified that error appears in the above-identified patent and that said Letters Patent is hereby corrected as shown below:

In the Claims

Claim 9, Column 24, Line 16, "the snowmobiles of" should read -- the snowmobile of --

Signed and Sealed this
Twenty-first Day of November, 2017

Joseph Matal
*Performing the Functions and Duties of the*
*Under Secretary of Commerce for Intellectual Property and*
*Director of the United States Patent and Trademark Office*